(12) United States Patent
Gordon et al.

(10) Patent No.: US 11,778,958 B2
(45) Date of Patent: Oct. 10, 2023

(54) MULTI-SOURCE HEAT EXCHANGE SYSTEM EMPLOYING A GROUND-ENERGY STORAGE SYSTEM FOR CONTROLLED ENVIRONMENT ENCLOSURES

(71) Applicant: Ceres Greenhouse Solutions LLC, Boulder, CO (US)

(72) Inventors: Richard A. Gordon, Corvallis, OR (US); Swapnil Kumar, Boulder, CO (US); Marc Adolf Ernst Plinke, Boulder, CO (US); Christian Lee Houpe, Boulder, CO (US)

(73) Assignee: Ceres Greenhouse Solutions LLC, Boulder, CO (US)

( * ) Notice: Subject to any disclaimer, the term of this patent is extended or adjusted under 35 U.S.C. 154(b) by 0 days.

(21) Appl. No.: 17/787,584

(22) PCT Filed: Sep. 16, 2021

(86) PCT No.: PCT/US2021/050760
§ 371 (c)(1),
(2) Date: Jun. 20, 2022

(87) PCT Pub. No.: WO2022/061045
PCT Pub. Date: Mar. 24, 2022

(65) Prior Publication Data
US 2022/0400625 A1 Dec. 22, 2022

Related U.S. Application Data

(60) Provisional application No. 63/079,461, filed on Sep. 16, 2020.

(51) Int. Cl.
*A01G 9/24* (2006.01)
*F24T 10/15* (2018.01)
*A01G 9/14* (2006.01)

(52) U.S. Cl.
CPC .......... *A01G 9/247* (2013.01); *A01G 9/1438* (2013.01); *A01G 9/245* (2013.01); *F24T 10/15* (2018.05)

(58) Field of Classification Search
CPC ...... A01G 9/247; A01G 9/1438; A01G 9/245; A01G 9/246; F24T 10/15
(Continued)

(56) References Cited

U.S. PATENT DOCUMENTS 5,634,515 A * 6/1997 Lambert ................. E21B 10/58
165/45
6,484,794 B1 * 11/2002 Schulak ................. F25D 16/00
165/53
(Continued)

FOREIGN PATENT DOCUMENTS

JP 06062498 B1 1/2017

*Primary Examiner* — Tho V Duong
(74) *Attorney, Agent, or Firm* — Invention To Patent Services; Alex Hobson

(57) ABSTRACT

A multi-source ground-to-air heat transfer system is configured to store thermal energy during a cooling/dehumidifcation mode of operation for future use during a heating mode of operation. The multi-source ground-to-air heat transfer system utilizes a ground loop that is configured under an enclosure, such as a greenhouse, and is in thermal communication with a thermal reservoir medium to conduct and store heat. A thermal exchange fluid is pumped through the ground loop and ground heat exchanger and may receive heat from a condenser during a cooling/dehumidification mode of operation and may liberate heat to the evaporator during a heating mode. The enclosure air may receive heat from the heat pump during a heating mode and may liberate heat to the evaporator during a cooling/dehumidification mode. The heat exchange system may employ a heat pump having a reversing valve to change the mode of operation.

55 Claims, 22 Drawing Sheets

(58) Field of Classification Search
 USPC .......................................................... 165/45
 See application file for complete search history.

(56) References Cited

U.S. PATENT DOCUMENTS

| | | | | |
|---|---|---|---|---|
| 8,529,156 | B2* | 9/2013 | Biggs | F24T 10/10 |
| | | | | 405/184 |
| 11,022,345 | B1* | 6/2021 | Halloran | F24T 10/15 |
| 2007/0295477 | A1* | 12/2007 | Mueller | F25B 13/00 |
| | | | | 165/45 |
| 2008/0142197 | A1* | 6/2008 | Van Andel | F28F 1/122 |
| | | | | 165/122 |
| 2008/0289795 | A1* | 11/2008 | Hardin | F24T 10/15 |
| | | | | 165/45 |
| 2010/0294456 | A1* | 11/2010 | Taraba | F24D 3/18 |
| | | | | 165/184 |
| 2011/0005151 | A1* | 1/2011 | Krecke | F28D 20/0052 |
| | | | | 454/238 |
| 2013/0299123 | A1* | 11/2013 | Matula | F25D 17/00 |
| | | | | 165/45 |
| 2015/0223407 | A1 | 8/2015 | Carroll et al. | |
| 2015/0282440 | A1* | 10/2015 | Shelor | A01G 9/246 |
| | | | | 47/17 |
| 2017/0013789 | A1 | 1/2017 | Bose | |
| 2018/0209694 | A1* | 7/2018 | Gordon | F28F 21/06 |
| 2018/0263194 | A1 | 9/2018 | Pilebro et al. | |
| 2019/0373820 | A1 | 12/2019 | Plinke | |
| 2020/0370804 | A1* | 11/2020 | Snider | F25B 13/00 |

\* cited by examiner

MULTI-SOURCE HEAT EXCHANGE SYSTEM EMPLOYING A GROUND-ENERGY STORAGE SYSTEM FOR CONTROLLED ENVIRONMENT ENCLOSURES

CROSS REFERENCE TO RELATED APPLICATIONS

This application claims the benefit of priority to U.S. patent application No. 63/079,461, filed on Sep. 16, 2020; the entirety of which is hereby incorporated by reference herein.

BACKGROUND OF THE INVENTION

Field of the Invention

The invention relates a multi-source ground-to-air heat exchanger that employs a fluid-to-ground heat exchange system and a fluid-to-air heat exchange system, that utilizes a flow of thermal exchange fluid that flows through a ground loop and then through the fluid-to-air heat exchanger, such as a heat pump, to control an enclosure temperature and humidity.

Background

Greenhouses provide improved growing environments for plants and enable plants to be grown in cold weather climates. In some locations, there are large temperature fluctuations throughout the day and this can be problematic. For example, high elevation areas, especially those nearer the equator can have very large temperature swings throughout a day, such as 10° C., 20° C. or even 40° C. or more. The temperature difference between the inside of the greenhouse and the outside temperature can be as high as 30° C. or more. This makes growing plant in a greenhouse difficult. In these locations, the interior or the greenhouse may become too hot during the day and then too cold during the night, stressing the plants and reducing their growth or killing the plants. There exists a need for a greenhouse that is specifically designed for growing plants in these more difficult regions.

Greenhouses are configured to allow sunlight into the enclosure. This is great for photosynthesis but also results in the greenhouse being heated by the sunlight. Many plants do not thrive and some will not survive outside of certain temperature ranges. In addition, in certain areas the temperature variation through a 24 hour cycle can be as much as 20° C. or more, such as in high elevation areas and deserts, including the south-western United States. In some areas, greenhouse enclosure temperatures during the day would become much too hot and much too cold at night without a temperature control system. Many greenhouses employ conventional heating, cooling and ventilation systems that are expensive to operate. Traditional HVACD systems are designed for human comfort and have limited moisture removal capacity. Air conditioning closed enclosure growing spaces to maintain temperature and humidity for plants within optimal ranges requires special design of integrated HVACD systems for making available HVAC systems efficient for this application.

It is important to control a vapor pressure deficit (VPD) within a greenhouse to prevent damage to the vegetation. VPD is the difference in the pressure exerted by moisture on the plants at a specified state and pressure at saturation. VPD indicates the evapotranspiration potential of the plants and is a great control variable for efficient operations of grow facilities. When the leaves of a plant get too hot they release water for cooling and this can cause the tips of the leaves to dry up and turn brown, or the entire leaf to die. Prolonged exposure to high heat that causes too great of a vaper pressure deficit can lead to the plant dying.

SUMMARY OF THE INVENTION

The invention is directed to a greenhouse and particularly to greenhouses configured for cold weather climates and to methods of growing plants in said greenhouses. An exemplary greenhouse of the present invention provides an increased light intensity within the greenhouse and therefore high production of plant growth. The exemplary greenhouse achieves this increased light intensity through design and orientation of the greenhouse. In addition, an exemplary greenhouse comprises a ground to air heat transfer (GAHT) system that efficiently moderates the temperature within the greenhouse. An exemplary greenhouse of the present invention enables efficient plant production in higher latitude regions and in high altitude locations.

An exemplary greenhouse comprises an enclosure having an offset gable between a south wall and north wall. The inside surface of the north wall may comprise a light reflective surface so that sunlight entering from the south wall and the south extension of the roof, the roof portion between the gable and the south wall, will reflect into the greenhouse enclosure. The south wall may comprise a plurality of south wall windows to allow and the south extension of the roof may comprise south extension windows to allow a large amount of light into the greenhouse. The south wall and/or the south extension of the roof may consist substantially of windows, wherein at least about 75% of the area is made up of windows, and preferably at least about 85%. The north wall may be opaque and may have less than 25% surface area that is windows and preferably less than about 10% and even more preferably, substantially windowless, or have less than a 10% surface area made up of windows. The north wall may be insulated to keep heat generated during the day from escaping and to thermally insulate the interior of the greenhouse from the cold temperatures at night. The north extension may also be substantially windowless and have less than a 10% surface area that is made of windows and preferably have no windows and be insulated, for the reasons provided herein.

The greenhouse also comprises an east and west wall and these walls may comprise a door and/or one or more windows. The surface area of coverage of windows on the east and west walls may be dependent on the location and the temperature ranges. A greenhouse in a very cold climate may have less windows on the east and west walls to maintain temperature throughout the night than a greenhouse in a more moderate climate. In cold climates, the east and west walls may have a window area of up to about 40% or even 50% and in more moderate climates the east and west window areas may be up to about 75% or even 85%. In the colder climates, the east and west walls may have less window area and therefore may provide more thermal insulation and may also have an interior that comprises a reflective surface, especially proximal the north wall.

The gable of the greenhouse may be offset toward the north wall, wherein the south extension of the roof is longer than the north extension of the roof. The gable may be substantially over the north wall, whereby there is no north extension of the roof. The offset gable at least 20% closer to the north wall than the south wall, or at least 50% or even 80% closer, as determined by horizontal distances from the gable to the north wall versus the south wall. The offset gable provides more south facing roof area and this south facing roof area may have a high percentage of windows, or greater than 50%. The gable may be offset, wherein the ratio of the distance from the gable to the north wall over the distance from the gable to the south wall, as measured normal to the height of the greenhouse, is at no more than 3/4, no more than 2/3, no more than 1/2, no more than 1/3, no more than 1/4, zero and any range between and including the offset ratios provided. The south extension length will be longer than the north extension length when the gable is offset toward the north wall. The south extension may be about 1.5 times or more longer than the north extension, about 2.0 times or more longer than the north extension, about 3.0 times or more longer than the north extension, about 5.0 times or more longer than the north extension and any range between and including the ratio of south to north extension lengths. It may be beneficial to have a much longer south extension than north extension to increase the light entering the greenhouse. The south rise angle, the angle of the south extension to the gable, will be less than the north rise angle, the angle of the north extension to the gable, since the north extension is shorter with an offset gable and therefore requires a steeper angle to the gable from the north wall. The gable angle is the angle from the south extension to the north extension as measured about the gable.

The south extension comprises light transmission materials or windows that may be configured over a majority of the area of the south extension. The south extension may be substantially windows, or light translucent materials, such as at least 75% of the south extension surface area, or at least 85% of the south extension area, or at least 90 or 95% of the south extension area. The south extension area or surface area is the product of the length and width of the south extension. An exemplary south extension may comprise high light transmission materials, such as glass, or polycarbonate however, polycarbonate is susceptible to ultraviolet (UV) light degradation and coatings are often applied to reduce this degradation. Unfortunately, this coating reduces the UV light transmission, which is desired in a greenhouse. Therefore, other materials may be preferred, such as Acrylic, Ethylene Tetrafluoroethylene (ETFE), and Poly film that allow more of the full spectrum of light to pass therethrough. Ideally a light transmission material will allow at least 80% of photo active radiation (PAR) light to pass through and more preferred is 90% or more of PAR. A full spectrum light transmission material may be desired, such as down to 200 nm. It is important to have light transmission of light down to at least 380 nm, as this is photo active light. Lower wavelength light is good in greenhouse applications as insects do not like these lower wavelengths and will be deterred from entering the greenhouse.

The windows of the greenhouse, including those on the south extension, and/or south wall may transmit Power Light, or light within a wavelength spectrum that is absorbed readily by plants. This light may appear pink in color, as the green wavelengths of light are reduced and/or removed from the transmitted light. Likewise, the interior of the greenhouse may comprise materials that reflect or transmit Power Light, and may comprise a coating or additive to change the wavelength to the wavelength range absorbed by vegetation, for example. Furthermore, Power Light reflectors may be configured strategically within a greenhouse to increase the amount of Power Light and may be configured around the plants, such as between rows of plants. A Power Light reflector may be a translucent material and/or reflective material. In an exemplary embodiment, a Power Light reflector is translucent and certain wavelengths of light are absorbed by the Power Light reflector and Power Light is transmitted therethrough. Power Light reflectors may be configured along the north wall or coupled to the north wall or to a movable reflective sheet configured along the north wall. Power Light reflectors may be configured along the east and west walls, and may also be configured along the south wall, and/or along the south extension.

The greenhouse may be oriented with the south wall facing substantially south, or within about 15 degrees of south. The greenhouse may be oriented with the gable length extending east/west, or within about 15 degrees of east west. The south extension may extend from the south wall substantially north to the gable. Plants may be configured within the greenhouse and light entering from the south wall and/or the south extension may reflect off of the inside reflective surface of the north wall and provide a more complete diffuse exposure of sun to the plants. This may prevent the need for rotating the plants to ensure a more uniform and full growth, which can be labor intensive and difficult to track.

The north wall and/or the north extension, as well as portions of the east and west walls may comprise a light reflective surface, such as a paint having reflective properties or a coating having reflective materials, a film or sheet of material attached to or configured over the north wall. In an exemplary embodiment, a sheet of material is configured to move to expose more or less of the reflective film over the north wall. A reflective material, a film, coating, paint, or sheet, may be a diffuse reflective material, a spectral reflective and may also allow some portion of the light or heat to pass therethrough. An exemplary reflective material may have a light reflective value (LRV) of about 50% or more, about 75% or more, about 85% or more or about 95% or more and the selection may depend on the location of the greenhouse and environmental conditions. For example, a greenhouse located in northern latitude where the temperature drops a lot during the night may require a reflective material with an LRV of no more than about 75% to allow energy to pass through to heat the phase change material. A diffuse reflective material may be preferred as may provide for a more uniform and distributed light that more effectively promotes plant growth. An exemplary diffuse reflective material, such as a paint, may comprise diffuse reflective components, including but not limited to ceramic particles, titanium dioxide ($TiO_2$) polymeric particles, polymeric material, porous spherical particles and the like. An exemplary reflective sheet, such as an Orca Grow Film, available from Orca Films LLC, is a diffuse reflective material. A reflective sheet may be configured along the north wall and may be configured to move up and down or across the north wall to change the amount of reflectance area along the north wall. In an exemplary embodiment, a reflective sheet is configured in a roll extending along the top of the north wall and an actuator is configured to unroll the reflective sheet down along the north wall to increase the light within the greenhouse. A reflective sheet may comprise a diffuse reflective material and may also comprise a Power Light reflector so that a diffuse Power Light is reflected from the north wall into the greenhouse.

The north wall and/or the north extension, as well as portions of the east, west and south walls may be thermally insulated to prevent heat loss at night to maintain the greenhouse within desired temperature ranges. A thermally insulated wall or roof extension comprises some form of thermal insulation material that increase has an RSI per meter of at least about 1.25 and preferably 3.0 or more, and even more preferably about 10.0 or more, and any range between and including the RSI per meter provided. The north wall, north extension, east and west wall may comprise a thermal sink material, such as a ceramic material that absorbs heat energy during the day and releases this stored heat energy at night. For example, the north wall may comprise brick, or cement board for this purpose.

Any windows on the east and west walls may be configured proximal to the south wall, wherein the east and west wall window depths, the distance from the south wall to the furthest end of window on that wall, is no more than about 60% of the total wall depth, and may be no more than about 50% of the total depth, or no more than about 25% of the total depth.

An exemplary greenhouse has a length, which extends substantially east/west, of at least 6 m and a depth of at least 3 m. The length may be about 10 m or more, about 20 m or more, about 40 m or more, about 60 m or more and any range between and including the lengths provided. Likewise, the depth, which extends substantially north/south may be about 6 m or more, about 10 m or more, about 15 m or more and any range between and including the values provided. The length to width ratio may be about 1.5 to 1, to about 3 to 1 or even to about 7 to 1. The height of the south wall may be about 2.5 m or more, about 3 m or more and when tall crops are grown, such as hops, the height of the south wall may be about 6 m or more, and may be any range between and including the heights provided, or from about 2 m to about 8 m. The height of the north wall may be 4 m or more, 5 m or more, 6 m or more or from about 3.5 m to about 8 m. In an exemplary embodiment, the north wall has a height greater than the south wall, such as at least 1.25 greater or more, or about 1.5 greater or more, about 1.75 greater to more, about 2.0 greater or more, about 2.5 greater or more and any range between and including the height ratios provided. Because the north wall is taller than the south wall, the south wall windows may be opened along with the windows along the top of the north wall to create a chimney effect, to draw air in through the south windows and out through the north wall windows. The angle the roof may be about 1/12 or more, about 2/12 or more, about 3/12 or as much as 4/12 and will depend on the latitude wherein a more northern latitude may have a steeper roof angle to capture more light and a more southern latitude may have a flatter, or less steep roof.

An exemplary greenhouse may have a headhouse that extends along the north wall. The design and orientation of the greenhouse of the present invention enables a headhouse to be coupled to the greenhouse without interfering with light entering the greenhouse. Conventional greenhouse and their orientation do not provide a feasible headhouse location. An exemplary headhouse may have a roof that is lower than the height of the north wall, creating a sawtooth roofline. An exemplary headhouse may extend the entire length of the greenhouse and have a doorway on the east or west ends of the headhouse. An exemplary headhouse may be 3 m wide o more, about 5 m wide or more or as much as 6 m wide or more and may be used to store water, may be a cool room for working, may include an office or bathroom and the like. A headhouse may provide additional thermal insulation to the north wall, which may be important in higher latitudes wherein the nighttime and winter temperatures may be very low.

An exemplary greenhouse, as described herein, may be configured with a turntable, wherein the greenhouse can be spun to change the orientation of the greenhouse with respect to south. In the winter months, the south facing wall, as described herein may face south to allow a large amount of light into the greenhouse to warm the greenhouse and prevent the interior from getting too cold, or below a lower threshold, during the night. This same orientation during the summer months may provide too much light and the temperature inside the greenhouse may get too high, or above an upper threshold for the plants. To prevent this, the greenhouse may be rotated in the summer, whereby the north wall now faces substantially south, within about 15 degrees of south, and the south wall therefore faces north. This orientation would allow much less light into the greenhouse and may be ideal for summer months when the sun is close to being directly overhead. A turntable may be support that rotates about a pivot and may comprise bearings and a drive motor to enable rotation of the greenhouse.

The north wall of an exemplary greenhouse, may comprise a phase change material that absorbs heat during the daylight hours and then emits heat into the greenhouse during the night to moderate the temperature of the greenhouse. Phase change materials are available with melting temperatures ranging from −5° C. up to 190° C. and many within the lower and upper threshold limits of most greenhouses. Phase change materials can store five to fourteen times more heat per unit volume than conventional storage materials such as water, masonry or rock. For this reason, phase change materials are preferred as a heat sink in the present invention. In an exemplary embodiment, a phase change material may have a melting temperature that is within the desired greenhouse temperature range or between the upper and lower threshold limits. This enables the phase change material to melt during the daylight hours to store heat and then release this heat as the greenhouse temperature drops at night.

Any suitable type of phase change material may be used including, but not limited to salt hydrates, fatty acids and esters, and various paraffins (such as octadecane) and ionic liquids. Most organic solutions type phase change materials are water-free, and can therefore be exposed to air. However, salt-based phase change materials must be sealed in an enclosure to prevent water evaporation or uptake. Suitable phase change materials are available from Climator Sweden AB, Entropy Solution LLC and PureTemp Inc., of Plymouth MN, Pluss Advanced Technologies Ltd of India and RGEES LLC, Candler, NC. An exemplary phase change material is PCM-HS22P from RGEES LLC, an inorganic hydrated salt mixture having a melting temperature of 23° C., liquid density of 1540 kg/m$^3$, solid density of 1840 kg/m$^3$, latent heat of 185 kJ/kg, and specific heat-liquid 0.73 kcal/kg·K).

Table 1 provides a list of some other exemplary types of phase change materials.

TABLE 1

| Material | Melting point ° C. | Heat of fusion kJ · kg$^{-1}$ |
|---|---|---|
| Paraffin 14-Carbons [35] | 5.5 | 228 |
| Paraffin 15-Carbons [35] | 10 | 205 |
| Paraffin 16-Carbons [35] | 16.7 | 237.1 |
| Formic acid [35] | 7.8 | 247 |
| Caprilic acid [35] | 16.3 | 149 |
| Glycerin [35] | 17.9 | 198.7 |
| p-Lattic acid [35] | 26 | 184 |
| Methyl palmitate [35] | 29 | 205 |
| Camphenilone [35] | 39 | 205 |
| Docasyl bromide [35] | 40 | 201 |
| Caprylone [35] | 40 | 259 |
| Phenol [35] | 41 | 120 |
| Heptadecanone [35] | 41 | 201 |

TABLE 1-continued

| Material | Melting point ° C. | Heat of fusion kJ · kg$^{-1}$ |
|---|---|---|
| 1-Cyclohexylooctadecane [35] | 41 | 218 |
| 4-Heptadacanone [35] | 41 | 197 |
| p-Joluidine [35] | 43.3 | 167 |
| Cyanamide [35] | 44 | 209 |
| Methyl eicosanate [35] | 45 | 230 |
| 3-Heptadecanone [35] | 48 | 218 |
| 2-Heptadecanone [35] | 48 | 218 |
| Hydrocinnamic acid [35] | 48 | 118 |
| Cetyl acid [35] | 49.3 | 141 |
| α-Nepthylamine [35] | 59 | 93 |
| Camphene [35] | 50 | 238 |
| O-Nitroaniline [35] | 50 | 93 |
| 9-Heptadecanone [35] | 51 | 213 |
| Thymol [35] | 51.5 | 115 |
| Methyl behenate [35] | 52 | 234 |
| Diphenyl amine [35] | 52.9 | 107 |
| p-Dichlorobenzene [35] | 53.1 | 121 |
| Oxolate [35] | 54.3 | 178 |
| Hypophosphoric acid [35] | 55 | 213 |
| O-Xylene dichloride [35] | 55 | 121 |
| β-Chloroacetic acid [35] | 56 | 147 |
| Chloroacetic acid [35] | 56 | 130 |
| Nitro napthalene [35] | 56.7 | 103 |
| Trimyristin [35] | 33 | 201 |
| Acetic acid [35] | 16.7 | 184 |
| Polyethylene glycol 600 [35] | 20 | 146 |
| Capric acid [35] | 36 | 152 |
| Eladic acid [35] | 47 | 218 |
| Pentadecanoic acid [35] | 52.5 | 178 |
| Tristearin [35] | 56 | 191 |
| Myristic acid [35] | 58 | 199 |
| Palmatic acid [35] | 55 | 163 |

An exemplary greenhouse may comprise an odor reducing material such as titanium dioxide. An odor reducing material may react with volatile organic compounds (VOCs) by reaction and sometimes the reaction is promoted by heat or light exposure. An exemplary odor reducing compound may be configured in a reflective material, such as a paint, coating, film or sheet.

An exemplary greenhouse of the present invention may comprise a Ground to Air Heat Transfer (GAHT™) system that regulates temperatures within the greenhouse through air manifolds configured in the ground. GAHT is a registered trademark of Ceres Greenhouse Solutions. During the day, the fan draws hot air from the greenhouse through a manifold of pipes buried underground. This cools the greenhouse, and simultaneously heats the soil, or the heat reservoir. When the greenhouse needs heating during cold periods, the GAHT™ system draws heat back up from the soil, creating warm air to heat the greenhouse. In other words, a GAHT system stores the heat from the greenhouse in the soil underground. The soil acts as thermal mass or heat reservoir, helping to regulate the air temperature of the greenhouse. An exemplary GAHT system provides energy-efficient climate control by using the mass of soil underground. Often called a ground to air heat exchanger or climate battery, GAHT™ systems serve four critical functions.

An exemplary GAHT system moves air into and/or out of the greenhouse enclosure. The air moving device may circulate greenhouse gas through the GAHT system to regulate the temperature in the greenhouse. The airflow rate may be high enough to exchange the air within the greenhouse at a rate of about 0.25 times/hour or more, about 0.5 times/hour or more, about 0.75 times/hour or more, about 1.0 times/hour or more, about 2.0 times/hour or more, about 4 times/hour or more and any range between and including the exchange rates listed. Since the greenhouse temperature is regulated by circulation of greenhouse gas through the GAHT system, less outside air is required. Less exchanges of greenhouse gas with outside air is required and therefore the greenhouse can be more energy efficient, especially when the outside air is cold. The exchange rates of greenhouse gas with outside air may be no more than about 4 times/hour or less, no more than about 2 times/hour or less, no more than 1 time/hour or less, or as low as 0.5 time/hour or less.

An exemplary GAHT system is used to regulate temperatures and humidity levels within a greenhouse. The GAHT system may provide cooling during the day when the temperature within the greenhouse reaches about 70° F. to 80° F. or about 21° C. to about 27° C. A GAHT system may be used to heat the greenhouse, such as during the night, when the temperature drops to below about 50° F. to 60° F., or about 10° C. to 17° C. The GAHT may be turned off when the temperature of the soil or thermal reservoir of the GAHT system is at a similar temperature or within a temperature delta of each other.

An exemplary GAHT system comprises a thermal mass, or heat reservoir, that transfers heat to and from the air manifold(s) of the GAHT system to regulate the temperature within the greenhouse. A thermal mass, heat reservoir includes a heat reservoir medium, which may simply be the soil or ground or may comprise additional thermal sink components, such as more thermally conductive materials or materials with high heat capacities, including but not limited to metal, quartz, stone, water and the like. In an exemplary embodiment, a thermal mass comprises one or more thermal reservoirs, an enclosure for a thermal transfer material, such as a container of water. One or more barrels or enclosures may be configured under the greenhouse and may contain water or other types of thermal mass materials, as described herein. In an exemplary embodiment, a thermal reservoir is actively heated or cooled by GAHT conduits than are configured around or near the thermal reservoir to enable thermal transfer between the thermal reservoir and the GAHT conduits. The GAHT conduits may extend around or coil around a portion of the thermal reservoir, for example.

An exemplary GAHT system may comprise a thermal medium heat transfer system. An exemplary thermal medium heat transfer system is a hydronic heat transfer system that utilizes a liquid heat transfer medium, such as water, to heat the thermal mass or reservoir used in the GAHT system. For example, a hydronic conduit may supply a flow of water to a heat reservoir and transfer heat to the heat reservoir. The flow of hydronic fluid may be to a thermal reservoir or thermal mass to change the temperature of the thermal reservoir or thermal mass and this thermal reservoir may be in thermal communication with the heat reservoir. For example, a hydronic conduit may provide a flow of warm or cold water to the soil to change the temperature of the soil or thermal mass. The GAHT manifold may then be used to moderate or change the temperature of the air flowing therethrough, and thereby moderate the temperature of the greenhouse. In an exemplary embodiment, a hydronic conduit may extend around a thermal reservoir, such as an enclosure of water configured in thermal communication with the GAHT manifold. In another embodiment, a hydronic conduit provides a flow of a hydronic fluid, such as water, to a thermal reservoir or enclosure. A hydronic conduit may fill an enclosure with warm water during the day and this hot water in the thermal reservoir may be used to heat air flowing through GAHT manifold at night to keep the temperature in the greenhouse above a lower threshold value. A thermal reservoir may have an inlet and an outlet. The inlet may receive heated or cooled hydronic fluid and the outlet may expel hydronic fluid. A hydronic fluid may be heated by a conventional hot water heater or other types of heaters for fluids. A hydronic fluid may also be heated by heat transfer from waste heat or a renewable heat source, such as from solar panels, solar water heaters or from compost and the like. A hydronic fluid heated by free or waste heat may provide for a more efficient greenhouse system.

In an exemplary embodiment, a greenhouse of the present invention comprises photovoltaic panels to generate electricity and this electricity may be used to power systems of the greenhouse, such as lights, the GAHT system and the like. The photovoltaic panels may be located on the roof of the greenhouse, such as on the south extension that faces south and provides for good exposure to sunlight. The photovoltaic panels may be configured along the south extension and proximal to the gable, along the uppermost portion of the south extension, or may be configured north of the gable. As described herein, the photovoltaic panels may be cooled by a flow of hydronic fluid, such as water. A wind power generator may be configured to provide power to the greenhouse as well and may be coupled to the greenhouse. An energy harvest greenhouse utilizes renewable energy to produce the required power for the greenhouse. For example, the photovoltaic panels may produce power during the day and a wind power generator may produce power at night for the light and the GAHT system.

An exemplary greenhouse may comprise additional heat management devices and systems, such as radiators configured within the greenhouse to cool the greenhouse. Radiators may be configured along the north wall, and a flow of fluid therethrough, such as a hydronic fluid may pull heat from the greenhouse during the heat of the day and this fluid may be stored and used later to heat the greenhouse at night and may flow back through the radiators or may be provided to the thermal mass or reservoir of the GAHT system.

In an exemplary embodiment, a greenhouse of the present invention is a closed greenhouse wherein there is only a small amount or no airflow out of the greenhouse. This may help to reduce water usage and to reduce odors such as when growing plants that produce a smell, such as *Cannabis*. A greenhouse with little to no air exchange with the outside poses some unique challenges, especially considering the immense temperature changes that can be brought on by varying sun intensity. An exemplary greenhouse achieves this by reducing the glazing to just the amount needed for plant growth during the hotter summer months and through the GAHT system and in some cases the use of phase change material (PCM). In addition, the construction of the greenhouse may have a reduced number of seams between different materials. The seams may be sealed by using at least double gaskets. As a result, an exemplary greenhouse has natural air exchanges that are as low as 1 AC/hr or less, or preferably 0.5 AC/hr or less. Standard greenhouses in comparison are in the range of 3 AC/hr and more.

An exemplary GAHT system may be used to pre-cool or pre-heat the incoming vent air which may be used to prevent or reduce mold. The greenhouse can be set under slight positive pressure to reduce any exchange with outside air. This will prevent disease and decrease CO2 usage. A pressurized GAHT™ system will also reduce radon buildup in the greenhouse.

An exemplary greenhouse may utilize translucent solar panel roofing materials. An exemplary translucent solar or photovoltaic material is available from. Soliculture Inc, Scotts Valley, CA. A translucent photovoltaic panel may produce Power Light, as described herein.

An exemplary greenhouse may utilize actuating insulation materials that can roll up/roll down as required. For example, at night, the actuating insulation material may be rolled out, such as along the roof or ceiling and may reduce the heat loss from the greenhouse. The insulation material may be light transmitting and/or may comprise a reflective surface that produce Power Light, and or diffuse light. An exemplary actuating insulation material expands when deployed to increase the thermal insulation properties and may comprise a pleated configuration that increase in thickness from a compressed folded state by at least about two times or more, or about five times or more, or about ten times or more. The actuating insulation material may be two to three millimeters thick when rolled up or folded and then five centimeters thick when expanded.

The invention is directed to a multi-source ground-to-air heat transfer system and is configured to store thermal energy during a cooling/dehumidification mode of operation for future use during a heating mode of operation. An exemplary multi-source ground-to-air heat transfer system utilizes a ground loop and a ground heat exchanger that may be configured under an enclosure and in thermal communication with a heat reservoir and/or with a thermal reservoir with a heat transfer medium therein, to conduct and store heat. A thermal exchange fluid is pumped through the ground loop and may receive heat from a condenser during a cooling/dehumidification mode of operation and may liberate heat to the evaporator during a heating mode. The enclosure air may receive heat from the evaporator during a heating mode and may reject heat through the condenser during a cooling/dehumidification mode. The heat exchange system may employ a heat pump having a reversing valve to change the mode of operation. The multi-source ground-to-air heat transfer system may be substantially self-contained wherein the air from the enclosure is circulated through the heat exchange system and no or very little outside air, such as not more than 20% and preferably no more than 10%, and even more preferably no more than 5%, is introduced into the enclosure throughout a 24 hour period. This may help to reduce potential contamination of the enclosure, such as can be compromised by pathogens from air outside the enclosure.

An exemplary ground loop and ground heat exchanger system may be configured substantially under the enclosure, wherein at least 30% of the length of the ground loop conduit in the ground is configured under the enclosure, and in a preferred embodiment, at least 50%, 75% or 90% of the ground loop conduit in the ground is configured under the enclosure. The ground loop is substantially under the enclosure when at least 75% of the length of the ground loop is configured under the enclosure. The thermal exchange fluid is pumped by a ground loop pump and a series of valves or flow regulators may be used to adjust the flow and direction of flow of the thermal exchange fluid through the system. The thermal exchange fluid may be water, or a fluid having an effective heat capacity. An anti-freeze agent may be included in the thermal exchange fluid to ensure it does not freeze as some of the conduit may be exposed to freezing temperatures. Locating the ground loop under or at least partially under the enclosure may prevent the need to include any antifreeze agent as the ground under the enclosure may be maintained above freezing temperatures. Antifreeze in the system increases viscosity, resulting in bigger pump sizes and higher pumping power, lowering the heat transfer through the system. Anti-freeze also adds to system cost and needs to be disposed off properly, to avoid environmental damage.

For eliminating anti-freeze from the system, a part of the ground loop is located under the footprint of the building. The fraction of loop under the footprint is determined by the thermal balance in the greenhouse enclosure. To keep the loop temperature above freezing, the amount of heat rejected to the ground over a certain time period is greater than the heat extracted from the ground over the same period.

Since the ground loop is enclosed under the footprint of the building, the radiation heat loss from the ground to the sky reduces significantly. The ground loop in the above configuration helps in eliminating the need for anti-freeze in the loop The ground loop conduit may be configured in a heat reservoir or be in thermal communication with the heat reservoir medium. A heat reservoir medium is a material configured to exchange heat with the thermal exchange fluid and store heat when in a cooling/dehumidification mode and liberate heat in a heating mode. An exemplary heat reservoir medium is sand and in particular fine sand having a density of not less than 1600 kg/m$^3$ (100 lbs/ft$^3$) or 1200 kg/m$^3$ (75 lbs/ft$^3$). Sand has a high heat capacity and is an effective thermal reservoir medium. Furthermore, packed fine sand is an effective material for inclusion under an enclosure. Fill sand, as used herein, is sand that is brought to and placed under the enclosure to act as a heat reservoir medium and may be screened and have a controlled particle size. A heat reservoir medium may also include other thermally conductive materials including metal, and naturally conductive minerals, such as quartz, crushed limestone, cement, granite and the like. The metal may be fragments of metal dispersed within the thermal reservoir along with a natural material, such as sand, as described herein.

The ground loop conduit may be configured to extend through or around a thermal reservoir that may be configured in the heat reservoir, such as under the enclosure floor. A thermal reservoir medium may be a fluid that flows into an out of the thermal reservoir, such as enclosures or containers.

An exemplary fluid-to-ground heat transfer system may include a hydration fluid conduit that is configured to dispense a hydration fluid into the heat reservoir medium. A hydration fluid may be water and may be produced by the evaporator. For example, during a heat pump cooling/dehumidification mode, condensate may be formed and collected and used as a hydration fluid. The hydration fluid may be used to enable the heat reservoir medium to absorb more heat, and this stored heat may then be liberated back to the thermal exchange fluid when required to heat the enclosure, such as during the night. Water has higher specific heat capacity than sand. The Specific heat capacity of water is 4180 J/Kg K which is five times higher than specific heat capacity of sand.

A ground loop is configured for high heat transfer and includes an output conduit from the heat exchange system coupled with the heat pump and an inlet conduit to the heat exchange system. The output conduit and inlet conduits may be coupled together by ground loop conduits to form a ground loop manifold, comprising a plurality of extension conduits, which may be smaller in diameter to increase the surface area and heat exchange capabilities. The outer diameter of a ground loop conduit of the heat exchange manifold, or more specifically the extension conduits may be about 35 mm or less, about 20 mm or less, about 15 mm or less, about 10 mm or less, about 6 mm or less, about 4 mm or less and any range between and including the diameter values provided. These smaller diameter conduits increase the ground loop thermal exchange density, or the surface area of the conduit as a ratio of the surface area occupied therein. The ground loop thermal exchange area density is the surface area of the extension conduits within a planar area under the greenhouse enclosure occupied by the extension conduits. For a single layer of extension conduits extending horizontally, the ground loop thermal exchange area density may be about 3.0 m$^2$/m$^2$ or more, about 2.0 m$^2$/m$^2$ or more, about 1.5 m$^2$/m$^2$ and any range between and including the values provided. The surface area of a circular conduit is the product of pi (3.14) and the diameter of the conduit, and when the conduits are placed in parallel horizontally, with no space therebetween, the ground loop thermal exchange area density is 3.14 m$^2$/m$^2$. For example, 10 mm outer diameter ground loop conduits extending adjacent to and parallel to each other over a 10 cm×10 cm area, spaced 20 mm apart, center to center, produce a ground loop thermal exchange area density ratio of 1.57 m2/m2. When the extension conduits extend vertically, the thermal exchange area density may be much higher, such as four or more, five or more, 10 or more and any range between and including the ground loop thermal exchange area density provided.

An exemplary heat exchange system is a heat pump having a reversing valve to change the mode of operation. An exemplary heat pump utilizes a refrigerant that is compressed in a compressor and then condensed in a condenser. The compressor may be a variable speed compressor. A condenser may liberate heat that can be exchanged with the thermal exchange fluid in a condenser heat exchanger. The ground loop conduit may be configured to exchange heat with portions of the heat pump, such as the condenser, wherein a portion of the ground loop conduit may be in contact with the condenser. The ground loop may extend to a coil-in-coil heat exchanger with the heat pump and in particular with the condenser. The condensed refrigerant is then expanded through an expansion valve and then passed to an evaporator wherein heat is absorbed via an evaporator heat exchanger.

A multi-source ground-to-air heat transfer system may employ one or more heat pumps and when two or more heat pumps are used, one may be operated in a cooling/dehumidification mode, while another heat pump is simultaneously operated in a heating mode to enable heating and dehumidification at the same time.

An exemplary enclosure is an enclosure that has heat regulation requirements that are much higher than most dwellings, such as a greenhouse enclosure that has a high percentage of windows. A greenhouse enclosure, as used herein, is defined as an enclosure wherein at least 25% of the exposed walls and roof are windows and in many cases an enclosure has at least 50% of the exposed walls and roof being windows. An exemplary multi-source ground-to-air heat transfer system for an enclosure may be substantially self-contained, as defined herein, wherein air is recirculated without or with a small percentage of outdoor air, thereby preventing contamination of the vegetation within the enclosure. An enclosure may be completely self-contained wherein no more than 2% of airflow includes outdoor air over a 24 hour period.

A multi-source ground-to-air heat transfer system may produce condensate and this condensate water may be used in a mister to produce a mist and/or may be used for irrigation or as a hydration fluid for the thermal reservoir medium. This condensate may have to be cleaned, filter or purified before use within the enclosure. The mist may be employed when the temperature in the greenhouse gets too high and the vapor pressure deficit reaches an upper threshold or when the relative humidity within the enclosure becomes too low. A spray of mist may quickly reduce the temperature of the greenhouse enclosure and provide an increased humidity to quickly lower the vapor pressure deficit. The water used for the mist system may be warmed, such as by one of the heat exchangers of a heat pump system to more quickly drop the temperature of the greenhouse enclosure and prevent water droplets from the mister from landing on the vegetation which may damage the plants. Heating the misting system water enables the mist to be vaporized more quickly and also the heat of vaporization is much greater than the heat required to increase the mist within the enclosure. A misting system may include conduits to receive water, such as condensate water from the heat pump system, mister or misters, and in some cases a heat exchanger to heat the misting water prior to being misted.

A fluid-to air heat exchanger of the multi-source ground-to-air transfer system may operate in a cooling/dehumidification mode, wherein the evaporator heat exchanger produces a flow of cooled air into the enclosure and the compressor rejects the heat to the thermal exchange fluid flowing to the ground loop conduit, whereby the heat reservoir medium is heated and the enclosure is cooled/dehumidified. As described herein, the cooling mode may also employ introducing a hydration fluid to the heat reservoir to increase the heat reservoir medium thermal conductivity and heat capacity. The heat absorbed by the heat reservoir medium during a cooling/dehumidification mode may be expelled and used to heat the thermal exchange fluid to heat the enclosure. In a heating mode, the heat pump of the fluid-to-air heat exchange system produces a flow of heated air into the enclosure and the condenser cools the thermal exchange fluid flowing to the ground loop and ground heat exchanger, whereby the heat reservoir medium is cooled and the enclosure is heated. Note too that the heat reservoir medium under the enclosure may heat or cool the enclosure by conduction through the floor of the enclosure. Again, note that a heat reservoir may include a thermal reservoir with a heat transfer medium therein and heat exchanged with the heat reservoir may include heat exchanged with the heat transfer medium.

A multi-source ground-to-air heat exchange system may employ two fluid-to-air heat exchangers. When the enclosure is a greenhouse, if one of the fluid-to-air heat exchangers goes down, the temperature within the greenhouse may exceed threshold temperatures for the vegetation and the vegetation may be lost. This would be a large financial loss for commercial growers. A multi-source ground-to-air heat exchange system employing two fluid-to-air heat exchangers would prevent this problem and provide some insurance of maintaining temperatures even when one unit goes down or needs service. In addition, when two fluid-to-air heat exchangers, such as two heat pumps are used, the discharge air may be mixed to provide a combination of temperature and humidity that is not otherwise possible with only one unit, such as hot and dry air, or cold and humid air. A mixing chamber may be included in the system to mix the air prior to discharge into the enclosure or the enclosure may act as a mixing chamber.

For high moisture applications, by reducing the blower fan speed the airstream gets increased contact time with the heat exchangers in the heat pumps. This results in the extraction of an increased amount of moisture from the airstream. Although, this takes away from the sensible heat capacity of the system, when sensible cooling load is high, the fan speed can be increased to increase the sensible capacity of the system. Variable speed fans are instrumental in providing a wide range of Sensible Heat Ratio (SHR) to the heat pumps, which is high advantageous in Greenhouse environments.

A multi-source ground-to-air heat exchange system may include a mixing plenum that is configured to receive enclosure air which may be mixed with some concentration or outside air and then fed to the heat pump or heat pumps. This mixing plenum may recover some energy from the enclosure air and reduce the energy requirement of the system. This system may be employed when outdoor air temp and/or humidity is enough for required air-conditioning in the greenhouse enclosure. The outside air may be drawn into the mixing plenum and to provide cooling or dehumidifying of the greenhouse enclosure. This system may also help to modify the oxygen or carbon dioxide concentration within the greenhouse enclosure by including some percentage of outside air back into the greenhouse enclosure, such as about 50% or more, about 30% or more, about 25% or more, about 10% or more and any range between and including the percentages provided.

A multi-source ground-to-air heat exchange system may include a water side economizer, which is a heat exchanger configured to exchange heat with enclosure air before returning to the heat pump(s). A water side economizer may use water may utilize a mechanical heat rejection device/water cooling device. A water side economizer may use water from a natural source, or natural body of water as described herein to provide cooling or heating of the enclosure air before return to the heat pumps. A source of hot water may be provided by a water heater or from water that is used in a separate heat exchanger of the system or from some other auxiliary source, such as from some other commercial process. Whenever the stream of chilled and hot water is available, the heat pump can run in economizer mode, wherein refrigerant cycle is not used (or the compressor is not needed), resulting in high energy savings. Alternatively, a water side economizer could be used to pre-cool or pre-heat the air before it enters the evaporator coils, reducing the compressor load.

A water side economizer may provide cooling redundancy because at they offer chilled or hot water in case of compressor failure, and can reduce the risk of greenhouse downtime.

A multi-source ground-to-air heat exchange system may include a fluid cooler to cool the thermal exchange fluid before it flows into the ground loop. This may be used to prevent the heat reservoir or thermal reservoir from getting too hot. A fluid cooler is a heat exchanger and may flow the thermal exchange fluid through thermally conductive conduits, which may be in a manifold and a flow of cool air may pass over these conduits to cool the fluid therein. When the ambient temperature is suitable, ambient air may be used by the fluid cooler. An alternate heat rejection device may be used such as dry cooler, cooling tower or an adiabatic fluid cooler.

The ground loop conduit may be configured to extend to an auxiliary heat exchanger, which may be a body of water and in particular may be a man-made body of water such as a pond, or a natural pond, lake, stream, river, bay, ocean, sea, etc. The thermal exchange fluid may flow through an auxiliary heat exchanger conduit to the auxiliary heat exchanger and then flow to the ground loop, or to the heat pump system of the multi-source ground-to-air heat transfer system.

The ground loop may be in thermal contact with a thermal reservoir that contains a phase change material, as described herein. The phase change material may be used to store heat for later use.

A multi-source ground-to-air heat exchange system may utilize a canopy that is configured to extend across the interior and proximal the top of the greenhouse enclosure to effectively create an air-exchange plenum between said canopy and the ceiling or roof, which forms the top portion of the plenum. The canopy may be a shade canopy that is deployable during the day to reduce sun exposure of the vegetation. At night this shade canopy may be actuated across the interior of the greenhouse enclosure to form the air-exchange plenum. The canopy may be a fabric material and two or more layers may be used with a gap between them for thermal insulation purposes. This plenum may be used to cool air when the outside temperature is low, such as at night. The roof of the greenhouse enclosure may be a material that has high thermal conductivity, such as metal or may comprise one or more air-exchange vents that can be opened to enable external air exchange with the air-exchange plenum. Air from the GHAT system or from the heat pump system may flow through this plenum and be cooled and may be directed or used to cool the heat reservoir. This flow of air may also prevent condensation along the interior of the roof or ceiling as well. In the case of a GHAT system, the airflow may flow through the GHAT system and in particular through the manifold that extends in the heat reservoir. This may cool the heat reservoir so it is better able to absorb heat the following day. The airflow from the air-exchange plenum may be used to flow over a heat exchanger of one of the heat pump heat exchange systems, such as over a condenser heat exchange.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
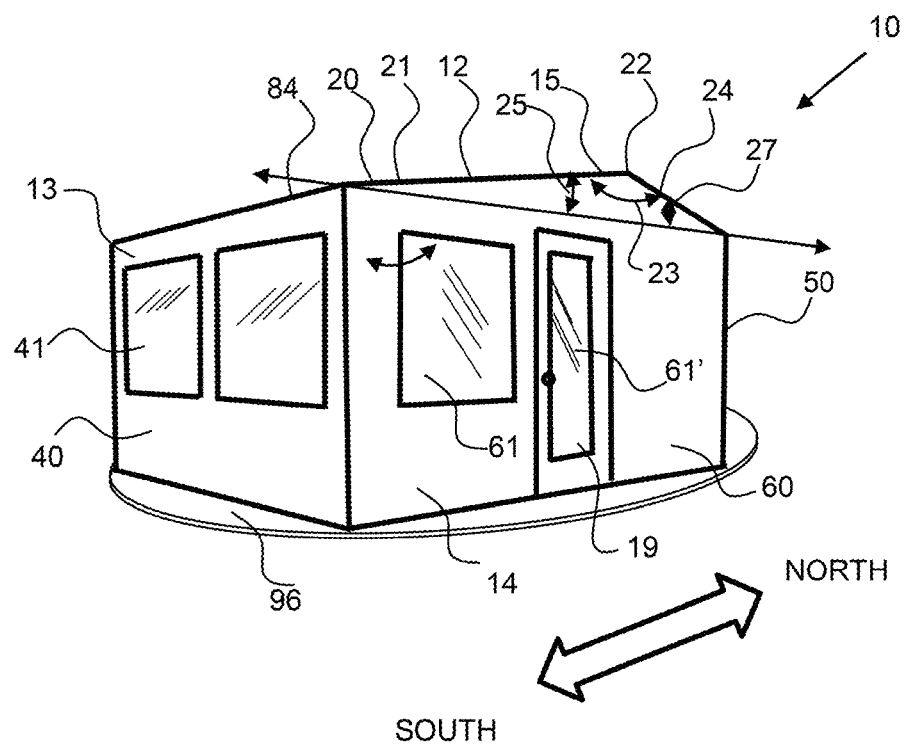
FIG. 1 shows a perspective view of a greenhouse having an offset gable between the north extension and south extension of the roof.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

In cases where the present specification and a document incorporated by reference include conflicting and/or inconsistent disclosure, the present specification shall control.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications and improvements are within the scope of the present invention.

Definitions

Windows, as used herein, is a light transmission material and may comprise glass panes, double wall and inert gas filed glass panes, hard and soft polymer sheets, such as polycarbonate and the like.

A wall or a north or south extension of an exemplary greenhouse consisting essentially of windows has a surface area that is at least 90% windows and comprises windows and may comprise supports configured between the windows that have a width that are no more than 10% of the width of the window and preferably not more than 5% of the width of the windows.

Power Light, as used herein, is light that may have a portion of the wavelengths removed and preferably is a wavelength spectrum(s) that is easily absorbed by plants and is conducive to plant growth and health.

A gable, as defined herein, is the support for the south extension and may be the top of the north wall or may be offset from the north wall. An offset gable is configured closer to the north wall than the south wall, as described herein.

A diffusive reflective surface, as used herein, is a reflective surface that reflects light across a span of at least 130 degrees and preferably at least 150 degrees.

A heat reservoir, as used herein, is a reservoir for thermal heat transfer with the GAHT system and particularly with the heat exchange manifold. A heat reservoir may transfer or receive heat with the GAHT system. A heat reservoir may be configured under the greenhouse and may comprise soil, stone, gravel, thermally conductive additives such as metal, water, a thermal reservoir that receives a thermal medium and the like.

A thermal reservoir, as used herein is configured to receive a thermal medium and is configured to exchange heat with the GAHT system.

As shown in FIG. 1, an exemplary greenhouse 10 has an offset gable 22 between the north extension 24 and south extension 20 of the roof 12, or an offset gable roof 15. The gable is offset toward the north wall 50 of the greenhouse enclosure 13. The south extension 20 is longer and has a lower south rise angle 25 than the shorter north extension 24 having a higher or larger north rise angle 27. The angle between the south extension and the north extension, or the gable angle 23 is greater than 90 degrees in this embodiment. The south and north rise angles are measured from a horizontal line or a line connecting the intersection of the south extension interface with the south wall 40 and the north extension interface with the north wall 50, respectively. The south wall has a plurality of south wall windows 41. The south wall windows may be configured over a majority of the south wall, or make up at least 50% of the south wall surface area. The east wall 60 has an east wall window 61 and a door 19. The door has a window as well, which is an east wall window, as it lets light in through the east wall. The east wall windows 41 are configured more proximal to the south wall than the north wall. The portion of the east wall proximal to the north wall may be thermally insulated and may comprise a light reflective surface, or an actuator for a reflective sheet on the inside surface of the east wall. The same may be true for the west wall. The roof has roof windows 84, or south extension windows 21 to allow sunlight to pass through the south extension of the roof. The north extension does not have any windows. Also shown in FIG. 1 is a turntable 96, a rotation feature to allow the greenhouse to be rotated depending on the time of year, as described herein. The greenhouse is support by the turntable and could be rotated manually or with the aid of a motor.

Figure 2:
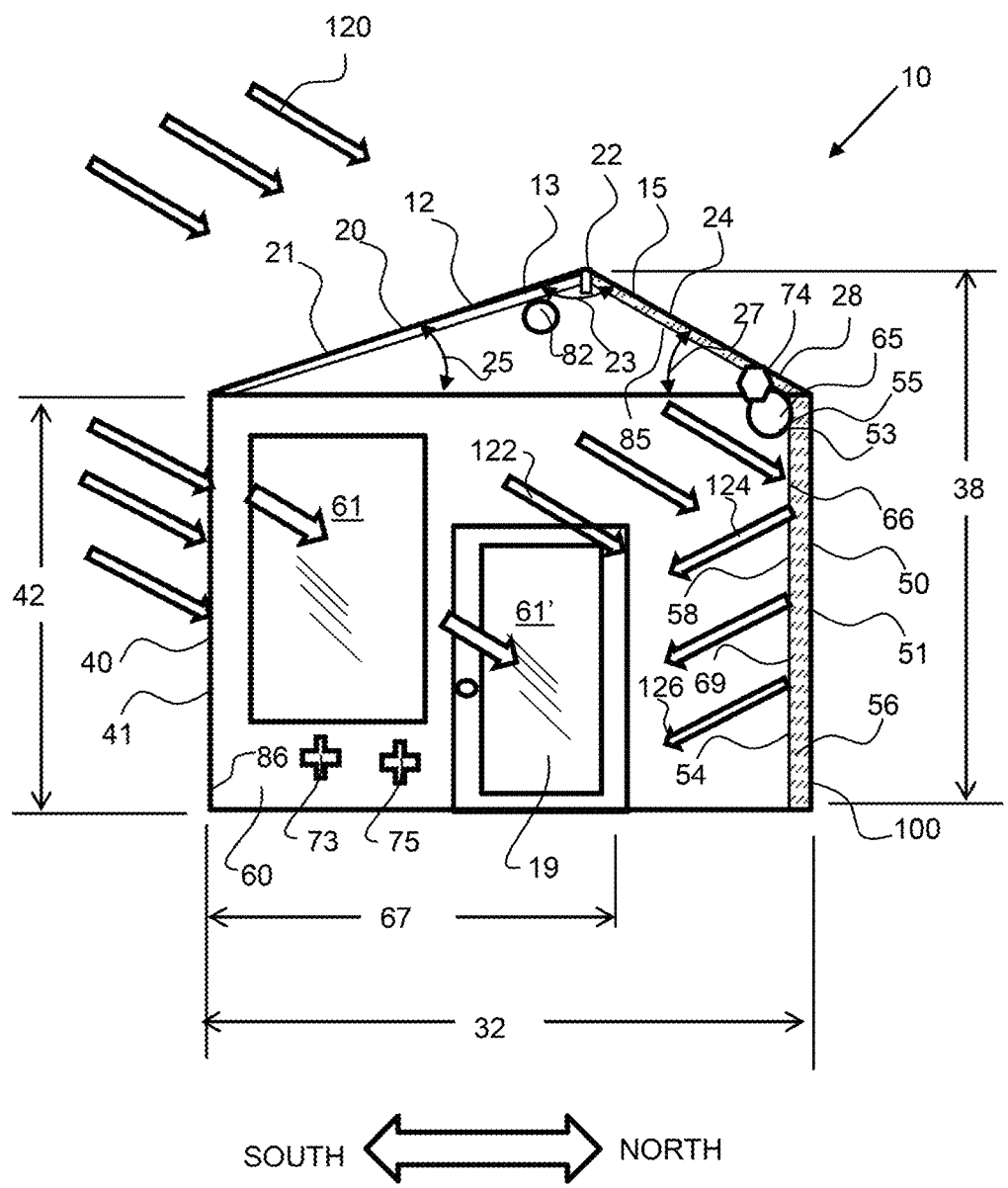
FIG. 2 shows an east wall view of a greenhouse having an offset gable roof.
Figure 3:
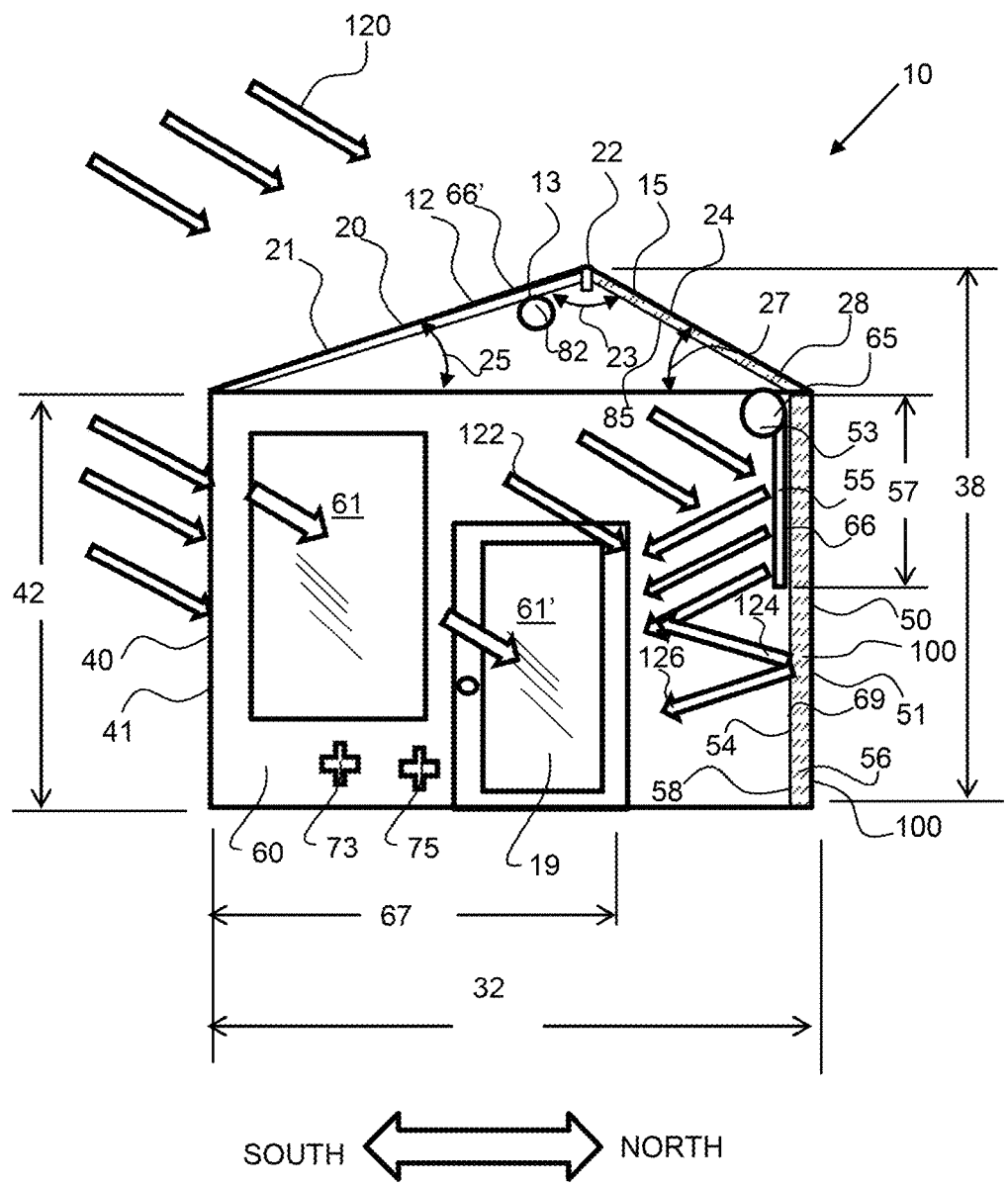
FIG. 3 shows an east wall view of a greenhouse having an offset gable roof and a reflective sheet actuator for controlling a reflective sheet depth along the interior of the north wall.
Figure 4:
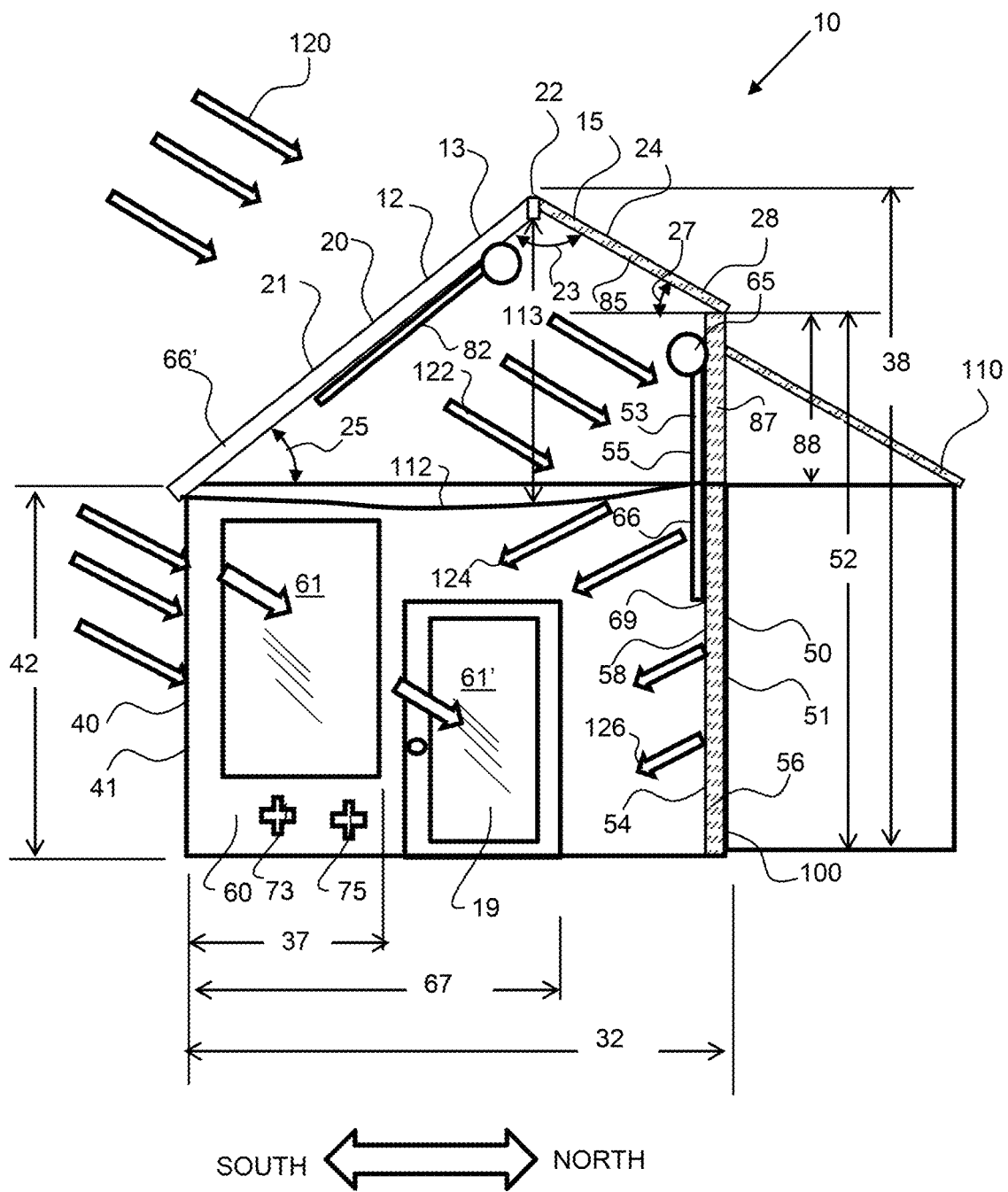
FIG. 4 shows an east wall view of a greenhouse having an extended height north wall.

As shown in FIGS. 2 to 4, an exemplary greenhouse 10 has an offset gable roof 15. The greenhouse enclosure 13 has a south wall height 42 and gable height 38, or height to the gable 22 of the roof 12. The enclosure has a width or depth 32 from the south wall 40 to the north wall 50. The east wall 60 has an east wall window 61 and a door 19. The door has a window 61'. The windows on the east wall extend to an east wall window depth 67, or the distance from the south wall 40 to the furthest window on the east wall. The east wall window 61 has a depth 37 from the south wall 40. The south rise angle 25, or the angle from the top of the south wall to the south extension 20 is shown. The north rise angle 27, or the angle from the top of the north wall 50 to the north extension 24 is shown. The gable angle 23, or the angle from the south extension 20 to the north extension of the roof is shown. As shown in FIGS. 2 and 3, the south rise angle is less than the north rise angle as the height of the north and south walls are substantially the same. The height of the north wall 52 in FIG. 4 is greater than the height of the south wall 42.

The north wall 50 has insulation 56 to prevent heat loss from the greenhouse, such as at night. In addition, the north extension 24 has insulation 28 to prevent heat loss. The sunlight or natural light 120 enters through the south extension windows 21 and is interior light 122 within the greenhouse. This interior light is incident on the inside surface 54 of the north wall 50 which has a reflective surface 58 and reflects off as reflected light 124. Reflected light 124 reflects off the inside surface of the north wall to provide multidirectional sunlight within the interior of the greenhouse. Note that the interior light or reflected light may be power light 126, as described herein. As described herein, this is beneficial for plant growth. Sunlight or natural light 120 also pass through the south wall windows 41 as well as the east wall windows 61, 61'. A door 19 may be configured on the east and/or on the west wall, or any of the other wall for additional light transmission. As shown in FIG. 2, an odor reducing material 86 is configured on the inside surface of the greenhouse to reduce smells associated with some plants, such as volatile organic compounds. The odor reducing material may be titanium dioxide that acts as a photocatalyst to react and destroy volatile organic compounds (VOCs) in the presence of heat or light.

As shown in FIG. 3, a sheet reflective sheet 55 extends down a reflective depth 57 from a sheet actuator 53, a take-up/unwind roller. The reflective sheet may be rolled up in a spool 65. The reflective sheet extends down along the north wall from the top or proximal the top of the north wall. As the requirements change, the reflective sheet may be actuated to provide a larger reflective area, or have a greater reflective depth, such as when the temperatures are cooler. The reflective area of the reflective sheet is the product of the reflective sheet depth and width of the reflective sheet, which may be about the width of the north wall. Alternatively, when the temperature of the greenhouse rises, a reflective sheet may be indexed up to reduce the reflective depth. The inside surface 54 of the north wall may be a reflective surface 58 that comprises a reflective material that may have different reflective properties from that of the reflective sheet, or may be less reflective, or light absorbing surface. In an exemplary embodiment, the reflective sheet reflects some light and allows a portion of the incident light to pass therethrough. An exemplary reflective sheet comprises a diffuse reflective material or surface that creates a diffuse reflective light, to increase the amount of light incident on plants within the greenhouse. Also, an exemplary reflective surface or reflective sheet may be a Power Light reflector 66, that produces power light, or light conducive for absorption by plants. The inside surface of the north wall may comprise a light absorbing surface 69 and the amount of reflectance may be controlled by the amount of the reflective sheet that is exposed by the actuator. The control of the actuator may be automatic and may be a function of the temperature in the greenhouse as measured by a temperature sensor 73 or the light intensity within the greenhouse as measured by a light sensor 75, and these sensors that relay the information to a controller 74 or to the actuator. The north wall may have one or more north wall windows 51.

As shown in FIG. 3, a phase change material 100 may be configured with the north wall and may absorb heat during daylight hours and then emit heat at night as the material changes phases due to temperature drop. The phase change material may absorb heat from direct light exposure, from the interior of the green house and from light or heat passing through a reflective sheet.

The interior of the greenhouse may comprise an odor reducing compound 85, such as TiO2, that will react with VOCs to reduce odor. The odor reducing compound may be configured along the north wall, the south, east and/or west walls, or along the inside surface of the north extension, and/or south extension. It may be preferred to have the odor reducing compound in an area where it will have direct light exposure and it may be configured on a reflective sheet or sheet that is configured, in some cases, to be actuated along the north wall. The wavelength of light may be about 380 nm for reacting the VOCs in the presence of the odor reducing compound.

As shown in FIG. 4, the height 52 of the north wall 50 is greater than the height 42 of the south wall 40 by an extension 87 having an extended height 88. This north wall extension provides a greater area for reflectance of light from the interior of the north wall and a greater area for phase change material. Also shown in FIG. 4 is a headhouse 110 coupled to the north wall. As described herein, a headhouse may provide additional thermal insulation along the north wall.

Figure 22:
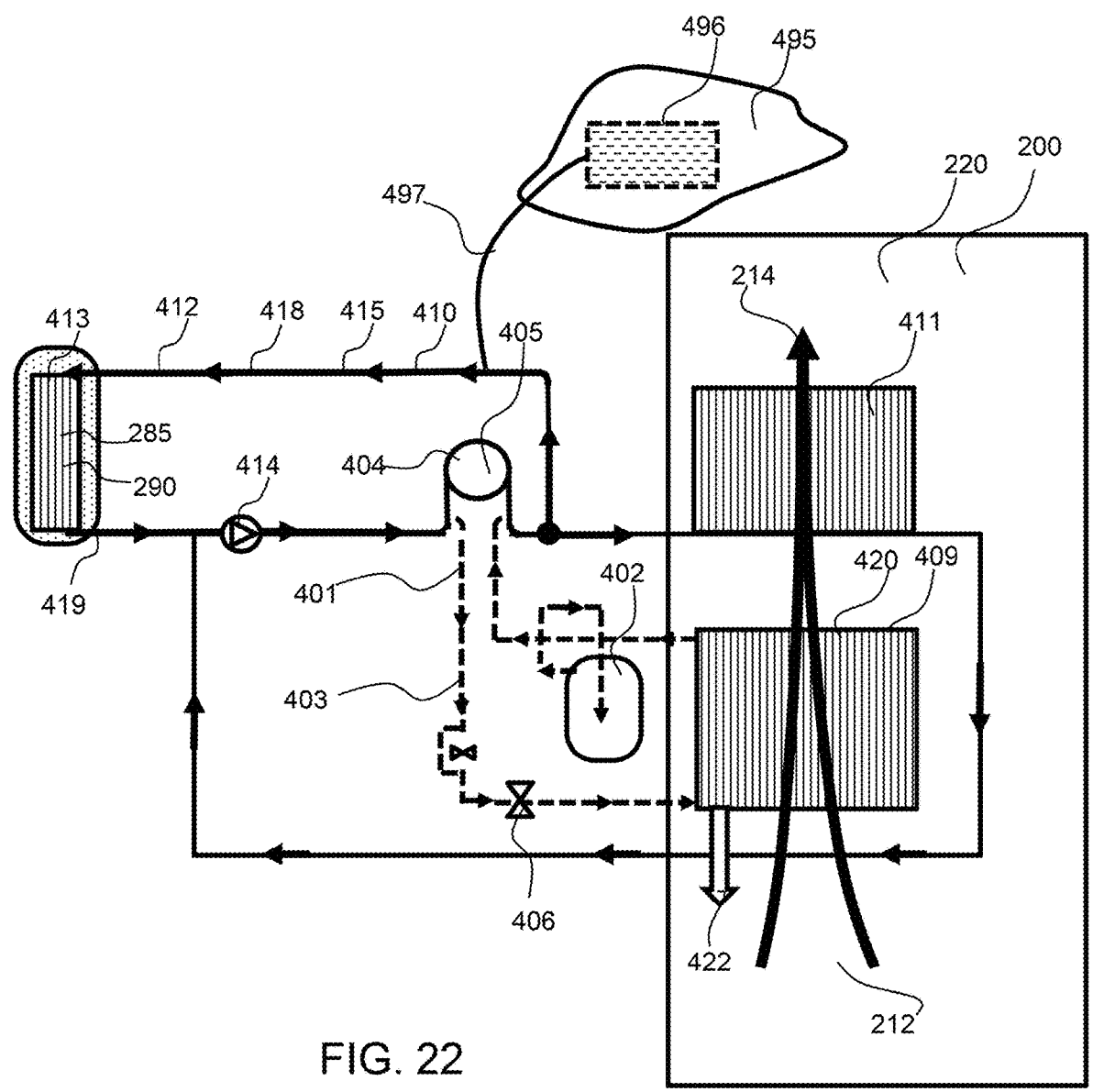
FIG. 22 shows the fluid-to-air heat exchange system shown in FIG. 21 having a cooling/dehumidification system to condense moisture from the intake air from the enclosure to produce condensate water.

As shown in FIGS. 2 to 4, an actuating insulation 82 is configured along the inside of the south extension and is shown rolled up or retracted in FIGS. 2 and 3 and deployed or actuated out from the actuator in FIG. 4. As described herein, the actuation insulation may comprise pleats or corrugations that enable the insulation material to fold and lay flat when retracted and that may open to increase the thickness of the actuating insulation when deployed, as shown in FIG. 22. As shown in FIG. 22, the actuating insulation 82 has a much greater thickness in a deployed state, as shown on the right side than in the retracted or stored state, as shown on the left side. The pleats 83 fold down over each other in the retracted state.

Figure 5:
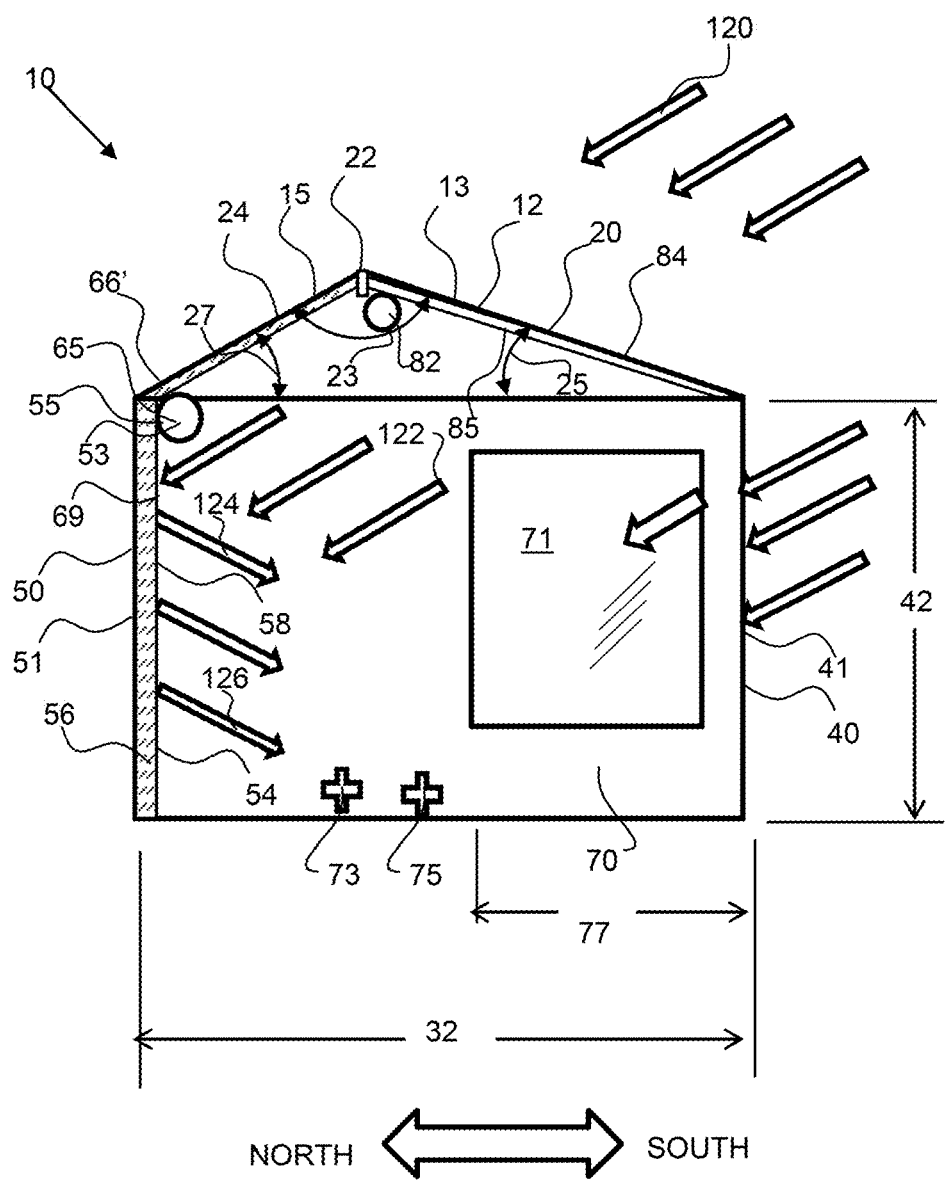
FIG. 5 shows a west wall view of a greenhouse having an offset gable roof.

As shown in FIG. 5, an exemplary greenhouse 10 has an offset gable roof 15. The west wall 70 has a west wall window 71 that allows sunlight to pass into the interior of the greenhouse. The west wall has a west wall window depth 77 that is the distance from the south wall 40 to the edges of the furthermost west wall window 71 from the south wall.

Figure 6:
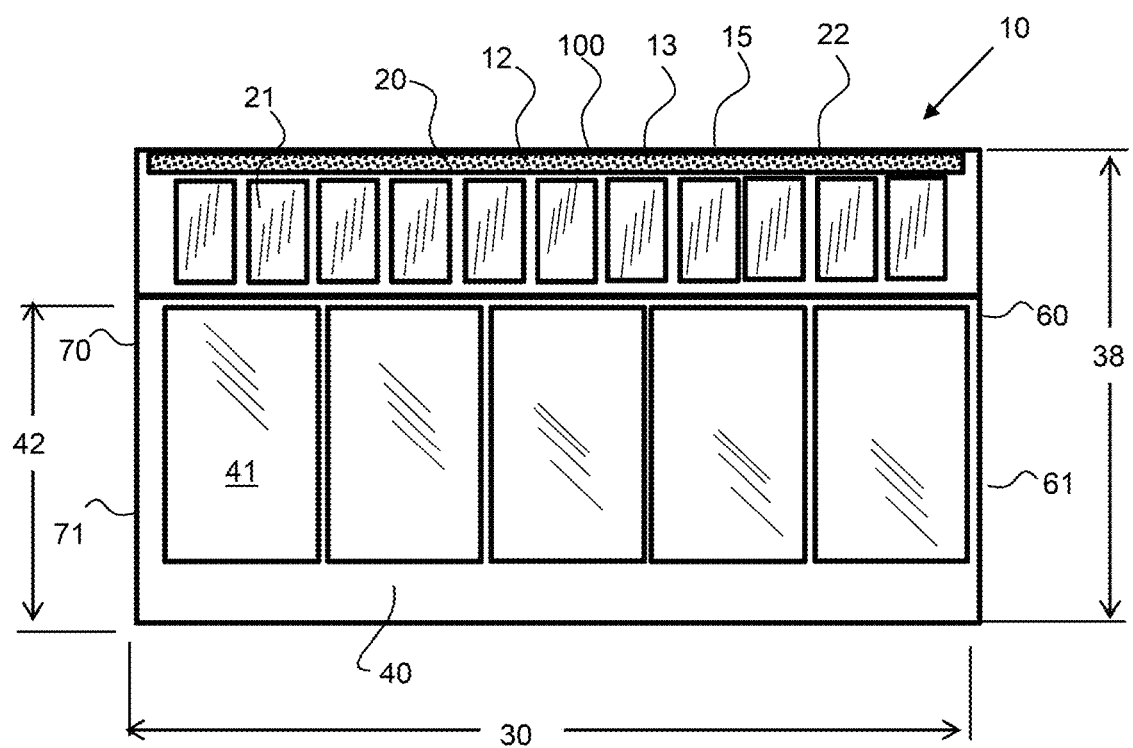
FIG. 6 shows a south wall view of a greenhouse having an offset gable roof.

As shown in FIG. 6, an exemplary greenhouse 10 has a south wall 40 having a plurality of south wall windows 41. The surface area of the south wall is predominantly windows, wherein more than 50% of the south wall surface area is made up of windows. The greenhouse enclosure 13 has a length 30 from the east wall 60 to the west wall 70. The length 30 may be the length of the gable. The south extension 20 has a plurality of south extension windows 21 that make up the majority of the surface area of the south extension. The south extension windows may be configured more proximal to the south wall than the gable, leaving a gap that may be used for a phase change material 100, as this elevated position will have a larger temperature change throughout the day and night. The portion of the south extension from the south extension windows to the gable may be insulated to prevent heat loss.

Figure 7:
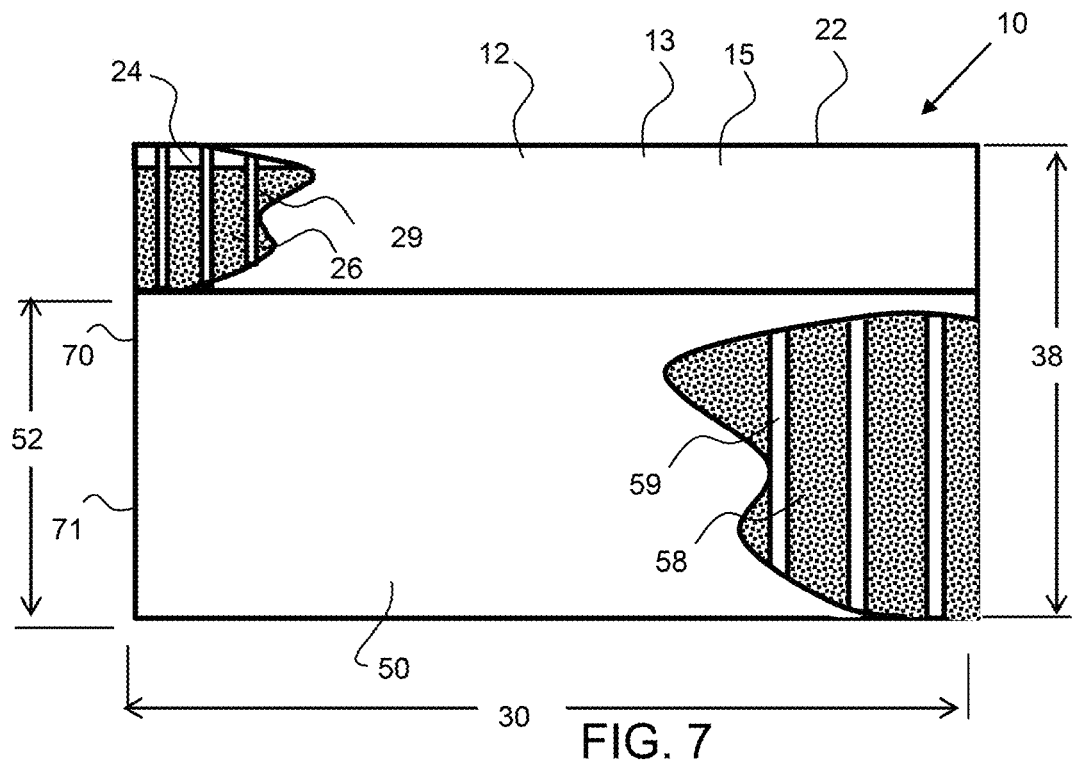
FIG. 7 shows a north wall view of a greenhouse having an offset gable roof.

As shown in FIG. 7, an exemplary greenhouse 10 has a north wall 50 with no windows. The north wall may be insulated having insulation 58 to prevent heat loss. The north wall comprises wall supports 59, such as studs to provide structural support and weight bearing of the roof. The north extension 24 may also have no windows and may comprise insulation 26 and roof supports 29, such as rafters that extend from the top of the north wall to the gable 24. The north wall has a height 52 and a length 30. As described herein, a headhouse may be configured along at least a portion of the north wall.

Figure 8:
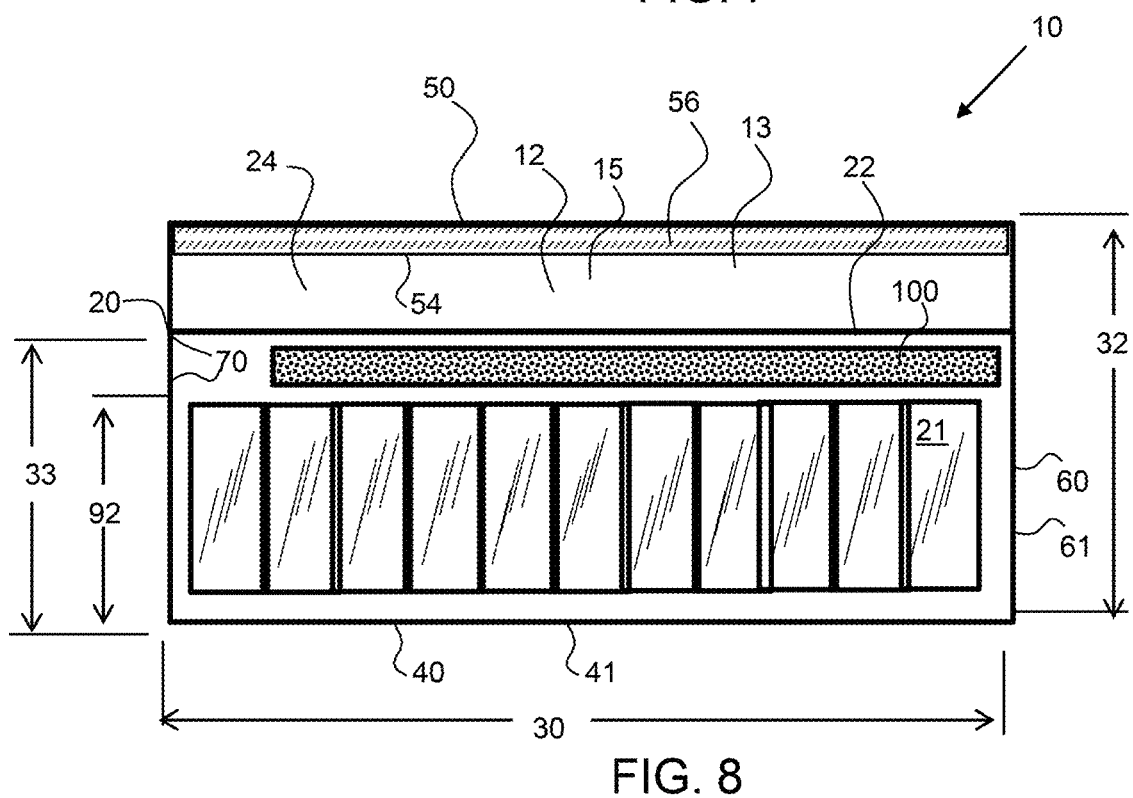
FIG. 8 shows a top view of a greenhouse having an offset gable roof.

As shown in FIG. 8, an exemplary greenhouse 10 has an offset gable roof 15, wherein the gable depth 33, or distance from the south wall 40 to the gable 22, is greater than the distance from the north wall 50 to the gable. The south extension 20 has a south extension window depth 92 that is a distance from the south wall to the furthermost south extension window 21 from the south wall. As described herein, the south extension windows may be configured more proximal to the south wall than to the gable for improved light transmission into the greenhouse enclosure 13 and for insulation of the top portion of the greenhouse. A phase change material may be configured in the gap between the south extension windows and the gable and may be configured on the north extension. The south extension area may be substantially south extension windows, wherein at least 75% of the area is windows, or at least 85% or 95% of the area is windows.

Figure 9:
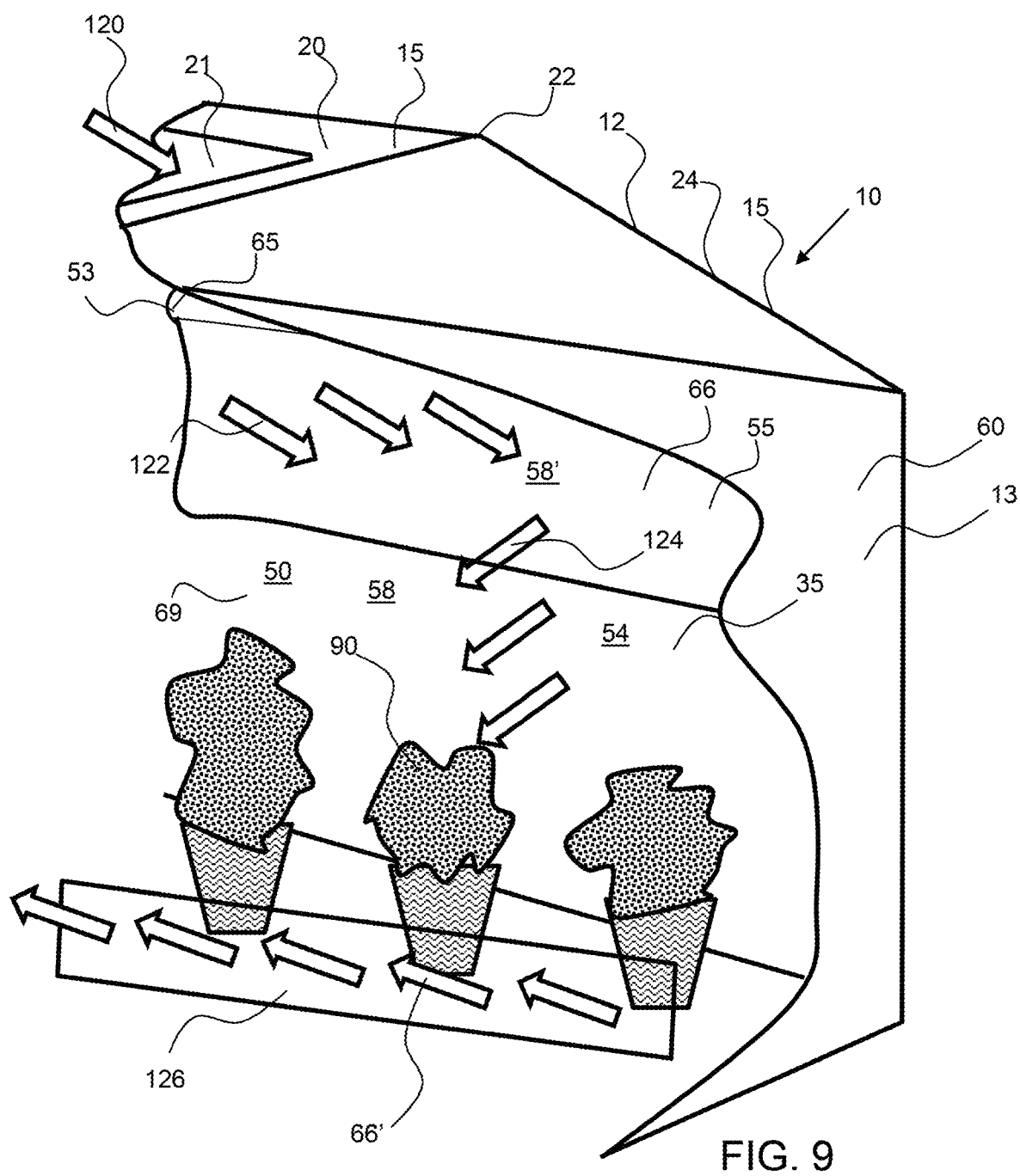
FIG. 9 shows a perspective cut-away view of an exemplary greenhouse having an offset gable roof and a reflective surface on the north wall to reflect the sun.

As shown in FIG. 9, an exemplary greenhouse 10 has an offset gable roof 15 and a reflective surface 58 on the north wall 50, or inside surface 54 to reflect that the interior light 122 that passes through the south extension windows 21. The reflected light 124 from the inside surface 54 of the north wall 50 provides diffuse reflected light to the plants 90, configured in the greenhouse. The unique geometry of the greenhouse described herein, provides reflected light 124, that may be multi-directional or diffuse reflected light to plants located in any location in the interior of the greenhouse, such as proximal the south wall and proximal the north wall. A reflective sheet 55 is shown extending down a portion of the depth of the north wall and may comprise a reflective surface 58' and/or a Power Light reflector 66. A Power Light reflector 66' is configured as a panel or sheet within the greenhouse and along a row of plants 90. This Power Light reflector will receive light reflected from the plants and from the rest of the greenhouse and transmit Power light 126.

Figure 10:
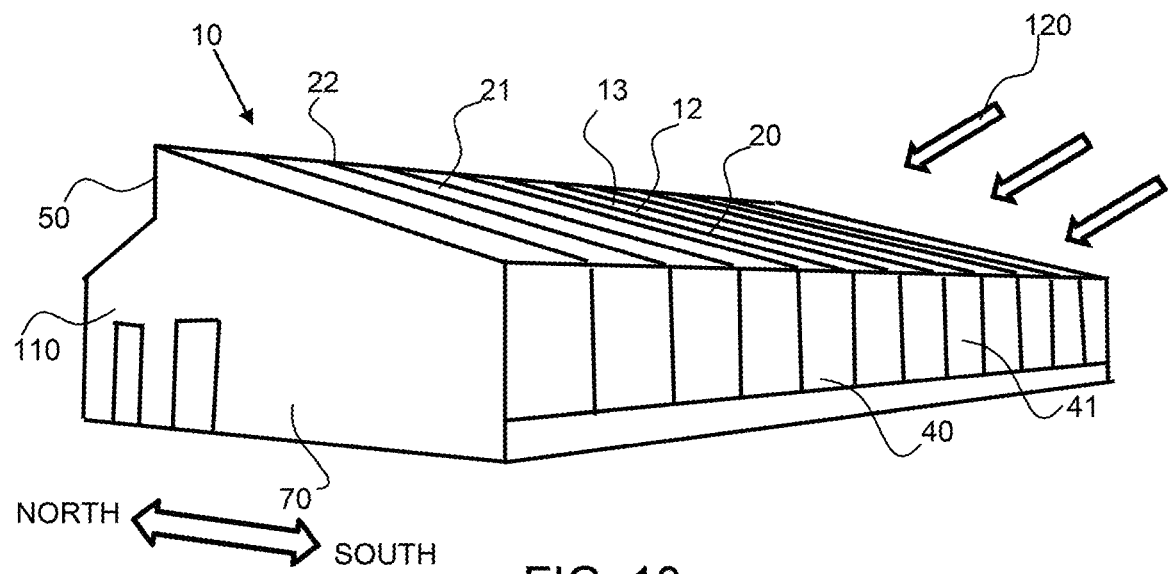
FIG. 10 shows a preferred shape and design of the greenhouse.

FIG. 10 shows the general shape and design of the exemplary greenhouse 10 described in Example 1. The greenhouse is configured with the south wall 40 facing south and the south extension 20 having south extension windows 21 extending from the south wall to the gable 22. The south extension consists essentially of windows, wherein the south extension surface area is at least 90% window and comprises windows and supports that are no more than about 10% of the width of the window, or preferably no more than about 5% of the width of the window, measured from east to west, as shown. A headhouse 110 is located along the north wall. The depth of the greenhouse is about 12.8 m (42 ft) and the length along the south wall is 22 m (72 ft). The ratio of length to depth is almost two. The north wall height is 6.1 m (20 ft) and the south wall height is 3.05 m (10 ft). The headhouse has a width of 3.05 m (10 ft) and a length of 22 m (72 ft). The headhouse does not have to have the same length as the greenhouse.

Figure 11:
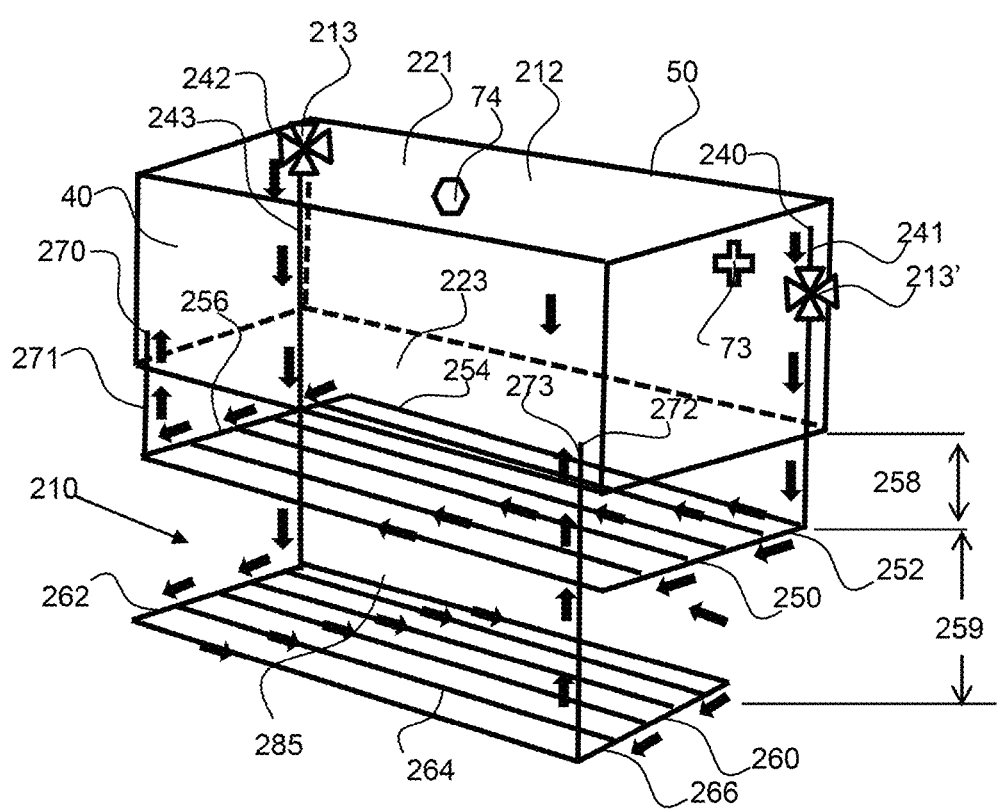
FIG. 11 shows an exemplary GAHT system having an upper manifold and lower manifold that extend under the greenhouse to control the temperature within the greenhouse.
Figure 12:
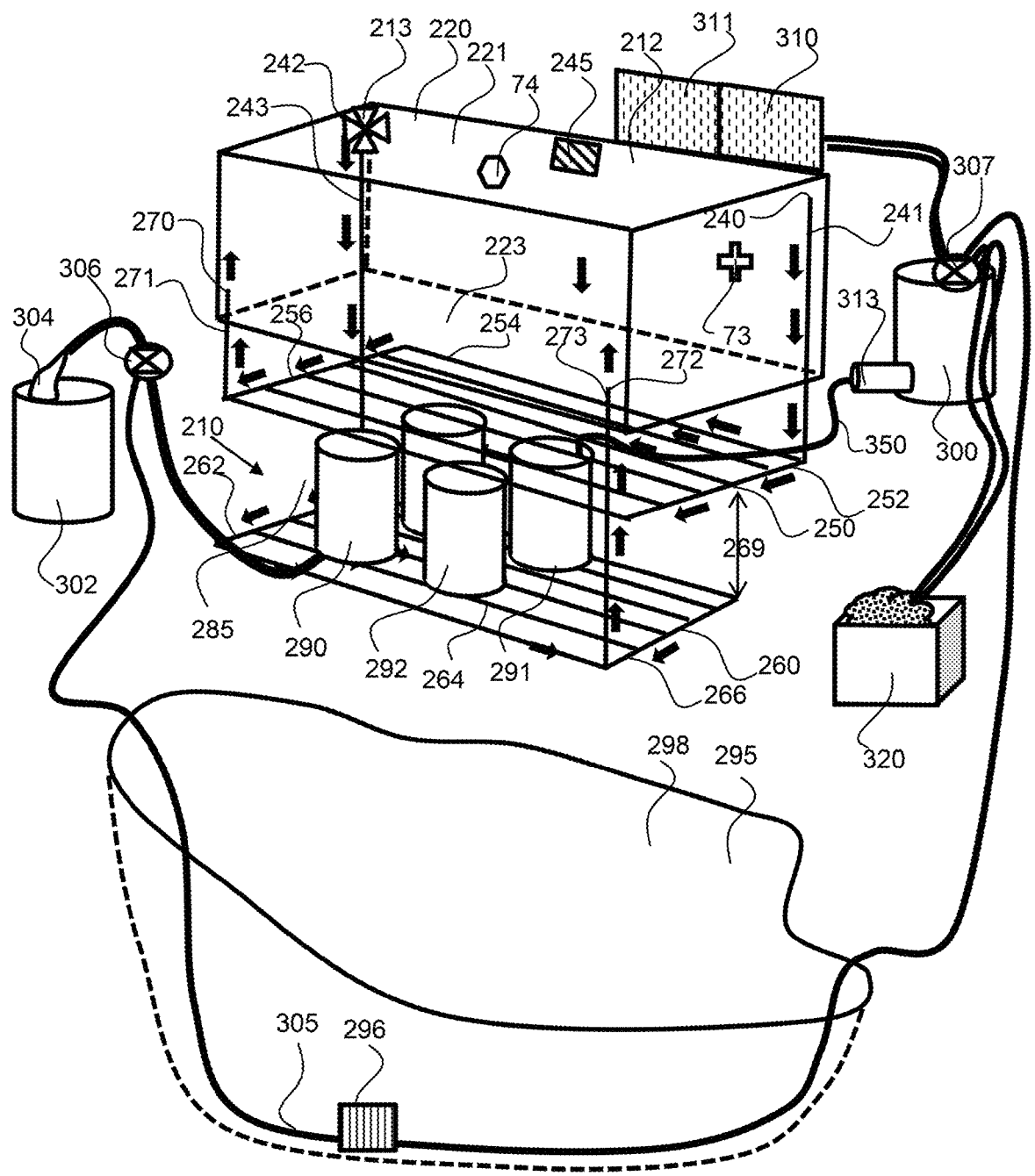
FIG. 12 shows a GAHT system with thermal reservoirs configured between and upper and lower manifold and a thermal medium conduit extending to a body of water.

It is to be understood that the GAHT system may be configured with any of the greenhouses shown in FIGS. 1 to 10. The GAHT system is shown separately for ease of illustration only. As shown in FIGS. 11 and 12, an exemplary GAHT system 210 has an upper manifold 250 and a lower manifold 260 that extend under the greenhouse and within the heat reservoir 285, to control the temperature within the greenhouse. The upper manifold comprises a series of extension conduits 254 that extend under the floor 223 of the greenhouse 203. The upper manifold is connected with an inlet conduit 241 having an inlet 240 for drawing air in from the interior of the greenhouse enclosure 220. The inlet 240 may be configured proximal to the top or ceiling 221 of the greenhouse, wherein the air may be warmer than air more proximal to the floor 223 of the greenhouse. The inlet conduit may extend to the inlet transverse conduit 252, having the extension conduits 254 extending therefrom. The extension conduits 254 extend under the floor to the outlet transvers conduit 256 which is coupled with the outlet conduit 271 having an outlet 270 within the interior of the greenhouse and more proximal to the floor than the inlet 240. The upper manifold may extend substantially horizontally under the enclosure, as described herein, wherein the extension conduits extend within about 40 degrees of horizontal, and preferably within about 20 degrees of horizontal and even more preferably within about 10 degrees of horizontal. This can be measure along the extension conduits or by measuring the angle between the inlet and outlet conduits. An upper manifold may be configured under the floor of the enclosure or from the ground surface a depth 258 of about 3 meters or less, or 2 meters or less or even 1 meter or less. If the upper manifold is too deep, there may be a reduction in the heat transfer with the floor of the enclosure.

An exemplary GAHT system may also have a lower manifold 260 that also extends horizontally under the upper manifold 250 a GHAT manifold offset distance 259. The lower manifold may extend a depth from the floor wherein the temperature of the soil is more consistent than the upper manifold. The lower manifold may be used to cool the greenhouse when the temperature approaches an upper threshold limit. The lower manifold comprises a series of extension conduits 264 that extend under the greenhouse floor 223. The lower manifold is connected with an inlet conduit 243 having an inlet 242 for drawing air in from the interior of the greenhouse enclosure 220. The inlet 242 may be configured proximal to the top or ceiling 221 of the greenhouse, wherein the air may be warmer than air more proximal to the floor 223 of the greenhouse. The inlet conduit 243 extends to the inlet transverse conduit 262, having the extension conduits extending therefrom. The extension conduits 264 extend under the greenhouse to the transverse conduit 266 which is coupled with the outlet conduit 273 having an outlet 272 within the interior of the greenhouse and more proximal to the floor than the inlet 240.

The lower manifold may extend substantially horizontally under the enclosure, wherein the extension conduits extend within about 40 degrees of horizontal, and preferably within about 20 degrees of horizontal and even more preferably within about 10 degrees of horizontal. This can be measure along the extension conduits or by measuring the angle between the inlet and outlet conduits. The lower manifold may extend substantially parallel, such as within about 10 degrees of parallel, with the upper manifold. The lower manifold may be configured under the enclosure or from the ground surface a depth of about 5 meters or less, or 3 meters, about 2 meters or less, or even 1 meter or less. The lower manifold may be configured from the upper manifold an offset depth of about 5 meters or less, about 4 meters or less, about 3 meter or less, about 2 meters or less or even 1 meter or less, any range between and including the offset depths provided.

The exemplary GAHT system may be used to control the temperature within the greenhouse, by pumping air from the greenhouse through one or more of the upper and lower manifolds. The manifolds are in thermal communication with the heat reservoir 285 and exchange heat with the heat reservoir to change the temperature of the greenhouse air flow as it moves through the GAHT system. An air moving device 213, 213' such as a fan or pump may be coupled with an inlet 242, 240, or outlet 270, 272 to move air through the GAHT system. A controller 74 may turn on the GAHT system when the temperature, as measured by a temperature sensor 73 indicates that the temperature has reached an upper or lower threshold limit. For example, when the temperature approaches an upper threshold limit during daylight hours, the lower manifold may be used to reduce the temperature within the greenhouse by pumping air from an inlet 270, proximal to the ceiling of the greenhouse, through the lower manifold, and out an outlet more proximal to the floor of the greenhouse than said inlet.

Figure 13:
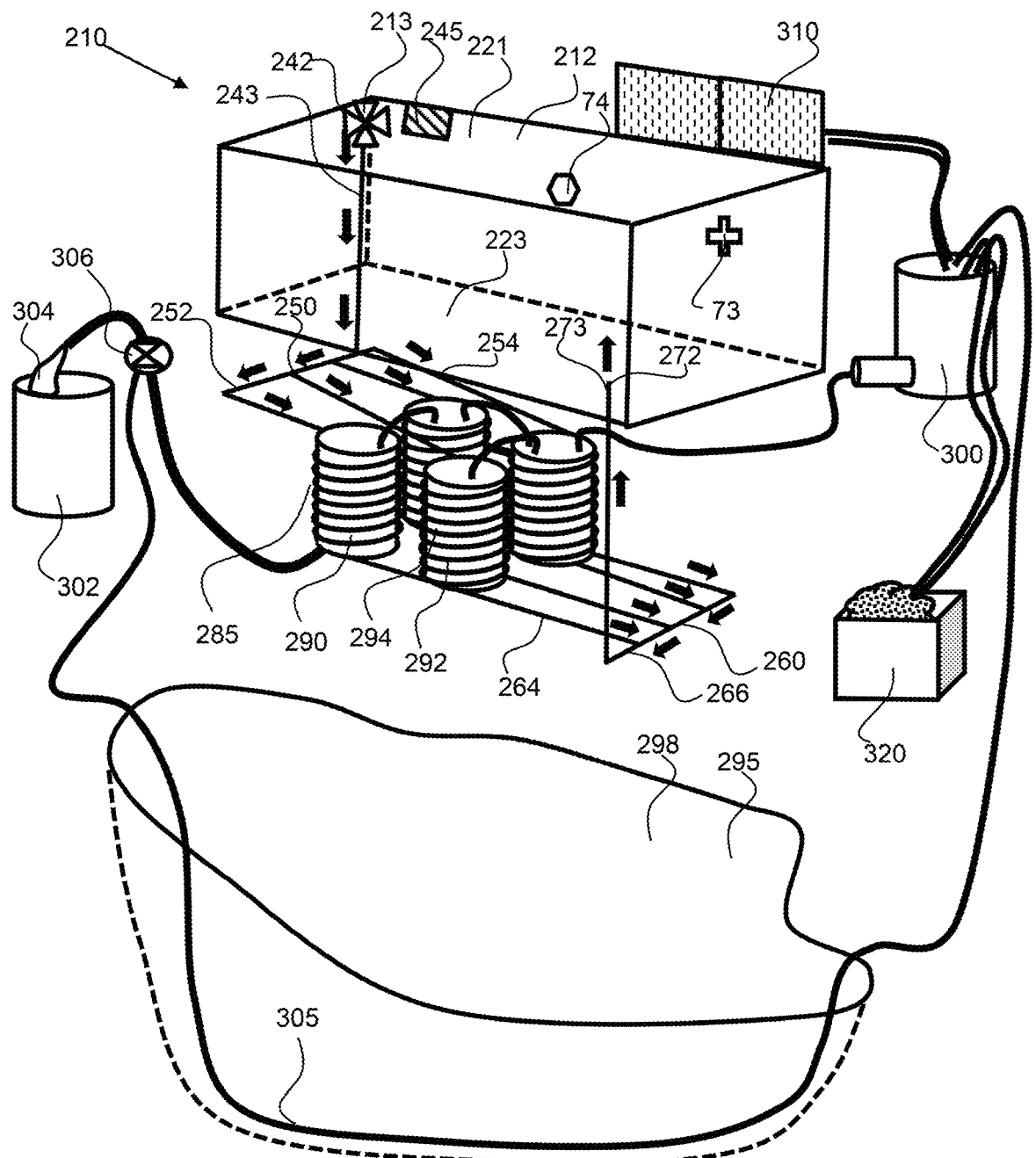
FIG. 13 shows aa GAHT system with GAHT conduits extending around the thermal reservoirs for heat exchange through conduction with the thermal reservoirs, and a thermal medium inlet reservoir and a thermal medium outlet reservoir.

As shown in FIG. 12, an exemplary GAHT system 210 comprises thermal reservoirs 290 configured between and upper manifold 250 and the lower manifold 260. The thermal reservoirs 290, such as containers for the thermal transfer medium 304 are configured in the heat reservoir 285 and under the floor 223 of the greenhouse enclosure 220. The thermal reservoirs may be water reservoirs 292, such as barrels. The thermal reservoirs 290 may be connected with a thermal medium inlet reservoir 300 and a thermal medium outlet reservoir 302. A thermal medium pump 313 may move the thermal medium to the thermal medium conduit 350 and may be a pump, fan or any other device for moving a fluid through a conduit. The thermal medium conduit 350 may be in thermal communication with the heat reservoir 285, such as the soil in and around the GAHT manifold or may be coupled with any of the conduits of the GAHT system. Valves may open and close coupling with the GAHT conduit to allow a flow of thermal medium therein or therearound. A thermal medium conduit may have apertures to allow a release of thermal medium into the heat reservoir, such as into the soil or thermal mass configured around the GAHT conduits. A thermal medium, or hydronic fluid, such as water, glycol or a solution containing glycol, may be pumped into the thermal reservoirs from the thermal medium inlet reservoir 300 and out of the thermal reservoirs to the thermal medium outlet reservoir 302 to control the temperature within the greenhouse. The thermal medium inlet reservoir may be temperature controlled, such as by being heated above ambient temperatures or cooled below ambient temperatures, to control the temperature inside of the greenhouse. For example, on hot days the greenhouse may approach an upper threshold temperature and cool water from the thermal medium inlet reservoir 300 may be pumped into the thermal reservoirs 290 to reduce the temperature within the greenhouse, wherein the GAHT system 210 provides cooling air as it is circulated through the upper and/or lower manifolds. A thermal transfer medium 304 may be heated by a fluid heater, such as a hot water heater, a boiler, solar heater or waste heat from waste water from the enclosure or nearby enclosures, or by flowing the thermal medium through a solar heater 311 or solar panel 310 to draw heat from the solar panel, which may include a photovoltaic panel, or by flowing it through compost 320 which generates heat as the part of the degradation process. Waste water, such as domestic waste water, may be hot or cold and used accordingly to exchange heat with the heat reservoir. Note that the flow of thermal medium to and from the GAHT may flow direct from the heating sources, such as the compost or photovoltaic panels or may flow to a thermal medium reservoir 300 and then to the GAHT as shown. The thermal transfer medium may also be pumped through a thermal medium conduit 305 to an auxiliary heat exchanger 296, which may be configured in a body of water 295, or through an external fluid. A heat exchanger may be the thermal transfer medium 305 or have increased thermal transfer via a manifold, for example. A thermal transfer medium may be a liquid, such as water or air, such as from the exterior of the greenhouse or interior of the greenhouse, and may be heated or cooled by flowing through one or more of the thermal exchange devices As shown in FIG. 13, an exemplary GAHT system 210 comprises GAHT conduits 294 extending around the thermal reservoirs 290 for heat exchange through conduction with the thermal reservoirs. As shown, four water reservoirs 292 have GAHT conduits that spiral around the barrels to provide conduction with the thermal reservoirs. Also, a thermal medium inlet reservoir 300 and thermal medium outlet reservoir 302 are coupled with the thermal medium reservoirs to provide a flow of thermal medium, such as water from the thermal medium inlet reservoir 300 to the thermal medium outlet reservoir 302. This arrangement provides an inlet and outlet flow of heat transfer medium 304 to and from the thermal reservoirs. The thermal medium inlet reservoir 300 and/or the thermal medium outlet reservoir 302 may be configured inside or outside of the greenhouse. Also, the thermal reservoirs may be configured in close proximity to or in contact with floor 223 of the greenhouse. A thermal medium outlet valve 306 may be configured to recirculate heat transfer medium 304 to form a thermal medium loop.

Figure 14:
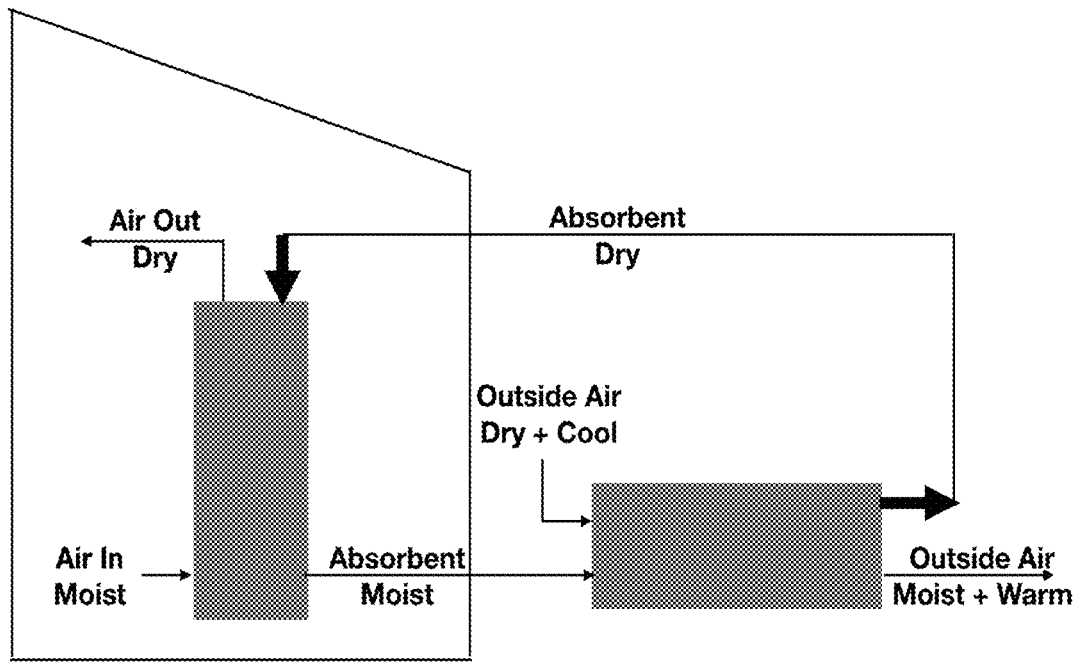
FIG. 14 shows a diagram of the airflow from a GAHT system into a greenhouse.

FIG. 14 shows a diagram of a solar dehumidification system using liquid absorbents. Humid air inside the greenhouse is dried in a vertical counter flow absorber. The dried air is released into the greenhouse. The liquid is pumped outside of the greenhouse into a horizontal solar heater. Once the liquid is heated above 60 C (140 F) the liquid releases the water to the outside air. The dried liquid is pumped back to the greenhouse.

Figure 15:
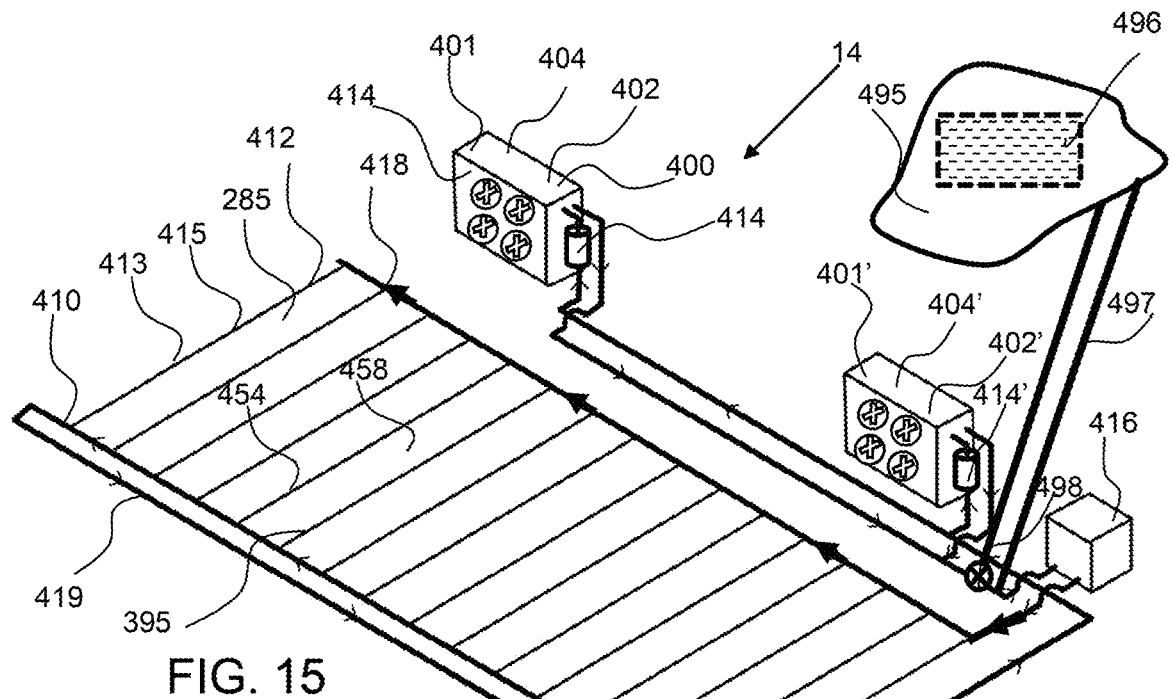
FIG. 15 shows a perspective view of a multi-source ground-to-air heat exchange system having a ground loop that circulates a thermal exchange fluid through a ground heat exchanger in a heat reservoir medium under an enclosure, such as an enclosure, and a heat exchange system that regulates the temperature of air within an enclosure and exchanges heat with the thermal exchange fluid of the ground loop.
Figure 16:
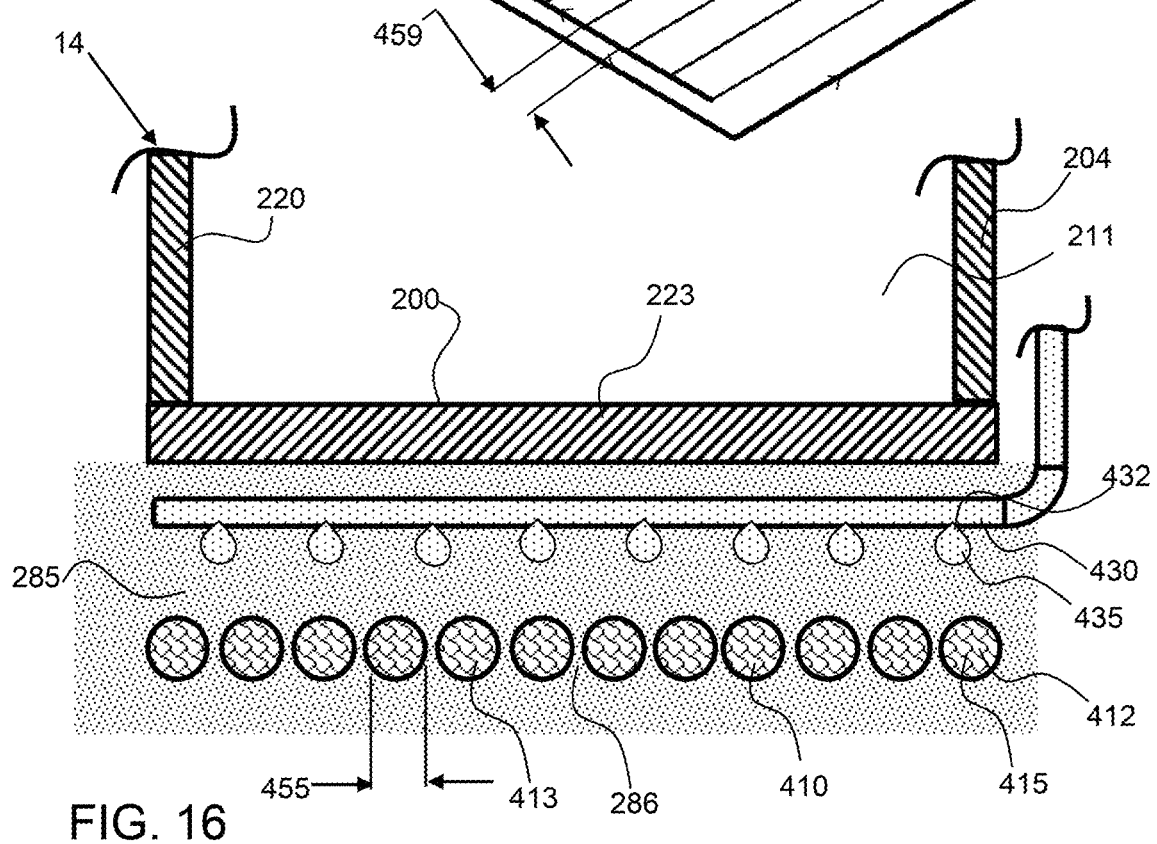
FIG. 16 shows a cross-sectional view of an enclosure having a ground loop heat exchanger and a hydration condensate conduit that supplies hydration condensate fluid to the heat reservoir medium configured under the floor of the enclosure.

Referring to FIGS. 15 to 16, an exemplary multi-source ground-to-air heat exchange system 14 includes a fluid-to-ground heat exchange system 395 that has a ground loop 410 and a ground loop heat manifold 413 in which a thermal exchange fluid 415 circulates through a heat reservoir 285 under an enclosure 200, such as greenhouse enclosure 220, and a fluid-to-air heat exchange system 400 that regulates the temperature and humidity of enclosure air 211 within the enclosure and exchanges heat with the thermal exchange fluid from the ground loop. As shown in FIG. 15, the ground loop 410 comprises a ground loop conduit 412 and a ground loop pump 414 to pump the thermal exchange fluid out through the thermal exchange fluid output conduit 418 and back through the thermal exchange fluid intake conduit 419. The ground loop conduit may comprise a ground loop manifold 413 configured between these output and intake conduits. A ground heat exchanger may comprise a plurality of extension conduits 454 that extend between the output conduit 418 and intake conduit 419 and these extensions conduits may extend horizontally therebetween, such as within about 45 degrees of horizontal, and preferably within about 20 degrees of horizontal and more preferably within about 10 degrees of horizontal. Openings or gaps 458 having a gap distance 459 may be configured between the of extension conduits 454, The ground loop conduits 412 and particularly the extension conduits 454 may be small diameter tubes for increasing the heat exchange between the thermal exchange fluid 415 and the heat reservoir 285.

The ground loop pump 414 pumps the thermal exchange fluid to the fluid-to-air heat exchange system 400 where it exchanges heat with the refrigerant of the heat pump 401, 401'. The heat exchange system may employ a first heat pump 401 and a second heat pump 401', each having a condenser heat exchanger 404, 404' a compressor 402, 402' and a ground loop pump 414, 414'. As described herein, the thermal exchange fluid may absorb heat from the heat exchange system or may expel heat to the heat exchange system depending on the mode of operation. Also, a heat exchange system may employ a plurality of separate systems, such as heat pumps 401, 401' to effectively regulate the enclosure air temperature and humidity, as described herein.

A fluid cooler 416 may be used to cool the heat transfer medium 304 before it flows into the ground loop. This may be used to prevent the thermal reservoir from getting too hot. A fluid cooler is a heat exchanger and may flow the thermal exchange fluid through thermally conductive conduits, which may be in a manifold and a flow of cool air may pass over these conduits to cool the fluid therein. When the ambient temperature is suitable, ambient air may be used by the fluid cooler.

As shown in FIG. 16, an enclosure 200 is configured over a ground loop 410 and ground loop manifold 413 of a fluid-to-air heat exchange system 400 that exchanges heat from the thermal exchange fluid 415 with the heat reservoir 285 which in turn exchanges heat with the floor 223 of the enclosure. The walls 204 of the enclosure 202 extend up from the floor. A hydration conduit 430 is configured to dispense a hydration fluid 435, such as condensate/water through hydration conduit outlets 432. The hydration fluid may be released to increase the heat capacity of the thermal reservoir medium, and in most cases will be water and preferable condensate water from the heat pump, such as from the evaporator of the heat pump. As described herein, the heat reservoir medium 286 may include, sand, and in particular fine sand, and the addition of water may increase the heat capacity of the sand thereby enabling more heat to be stored during the day, as the enclosure is cooled for warming the enclosure when enclosure is heated by the multi-source ground-to-air heat exchange system. The ground loop conduits 412 have a diameter 455 that may be small for effective heat transfer with the heat reservoir medium 286.

Figure 17:
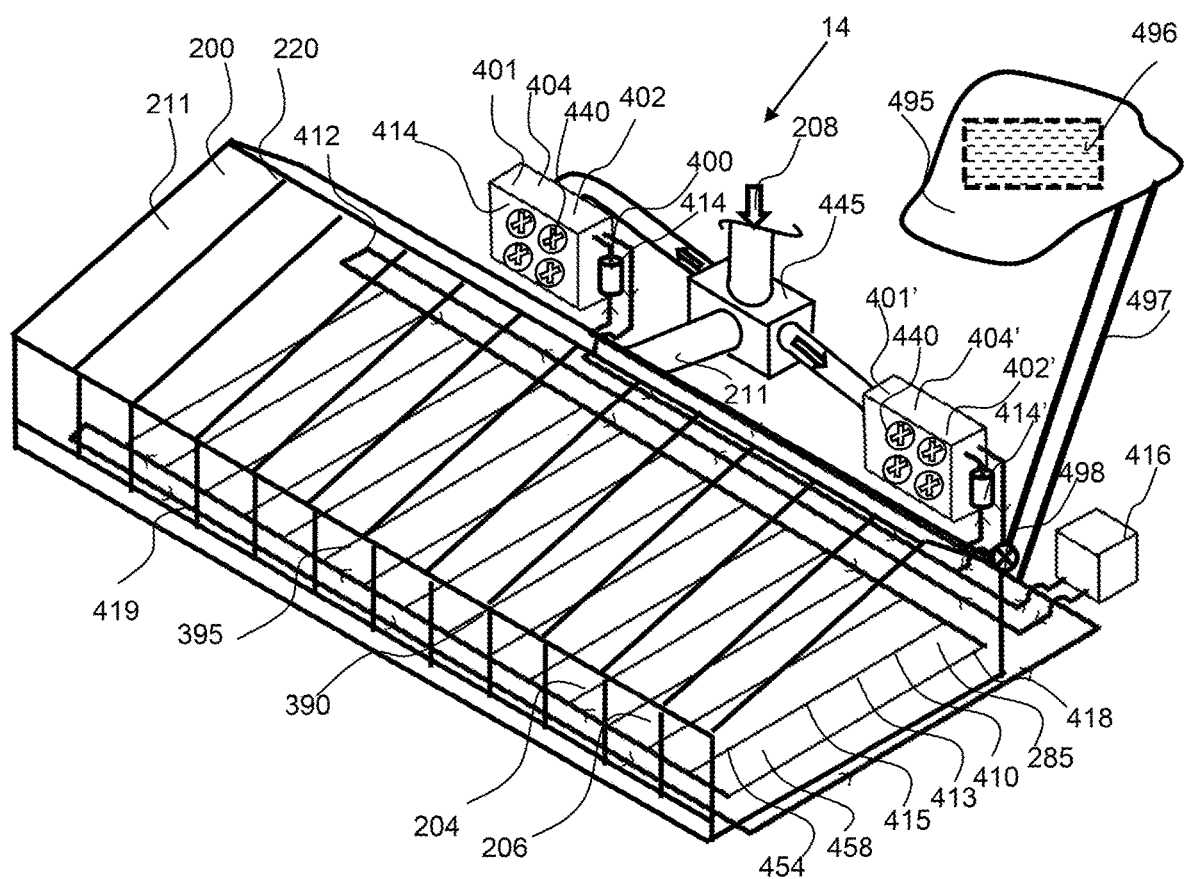
FIG. 17 shows a perspective view of a multi-source ground-to-air heat exchange system shown in FIG. 15, with an enclosure, such as a greenhouse enclosure configured over the ground loop and a first and second heat pump.

As shown in FIG. 17, an enclosure 202, such as a greenhouse enclosure 220 is configured over the ground loop 410 and the ground heat exchanger 390 of the water to ground heat exchanger system 395 employing a ground loop manifold 413. The enclosure may have a high percentage of the wall or roof area that is windows, as shown, wherein the south facing roof and walls are substantially windows. As shown in FIG. 17, the multi-source ground-to-air heat exchange system 14 utilizes a first heat pump heat exchange system 421 and a second first heat pump heat exchange system 421' that may each comprise the components shown in FIG. 20 and FIG. 23, including a heat pump 401, 401', a compressor 402, 402' and a condenser heat exchanger 404, 404' as shown. A first heat pump may be configured to regulate the temperature of the greenhouse enclosure 220 and the second heat pump may be configured to regulate the relative humidity within the greenhouse enclosure. Each of the heat pumps are coupled with a supply air plenum 440 that produces a flow of conditioned airflow into the enclosure and a return air plenum for receiving enclosure air 211 from the enclosure 200.

Each of the first and second heat pumps may be coupled with the ground heat exchanger 390 and utilize a thermal exchange fluid 415 that flows through the ground loop 410 and or through the thermal reservoir heat exchanger 291, which may be configure in a body of water. The heat reservoir 285 may be heated or cooled by thermal exchange between the ground loop conduit 412 and the ground loop manifold 413, which may be configured as a ground loop mat 500, as detailed in FIGS. 25 to 28. Again, any of the components shown throughout the figures may be combined into the multi-source ground-to-air heat exchange system 14.

As shown in FIG. 17, the thermal exchange fluid 415, may be diverted through an auxiliary heat exchanger conduit 497 to a body or water 495 and flow through an auxiliary heat exchanger 496 to cool the thermal exchange fluid 415 prior to flowing through the ground loop 410. The body of water may be natural or man-made body of water and may be configured above or below ground. A body of water may be large and may be at a low temperature, or lower than the heat reservoir, thereby improving the heat exchange in the ground loop and enabling the heat reservoir to be more effectively cooled. An auxiliary heat exchange valve 498 may be used to divert the thermal exchange fluid 415 to this auxiliary heat exchanger 496. The thermal reservoir heat exchanger 496 may simple be a conduit that extends into the body of water.

As shown in FIG. 17, a multi-source ground-to-air heat exchange system 14 may include a mixing plenum 445 that is configured to receive enclosure air 211 which may be mixed with some concentration of outside air 208 and then fed to the heat pump 401 or heat pumps 401, 401'. This mixing plenum may recover some energy from the enclosure air and reduce the energy requirement of the system.

Figure 18:
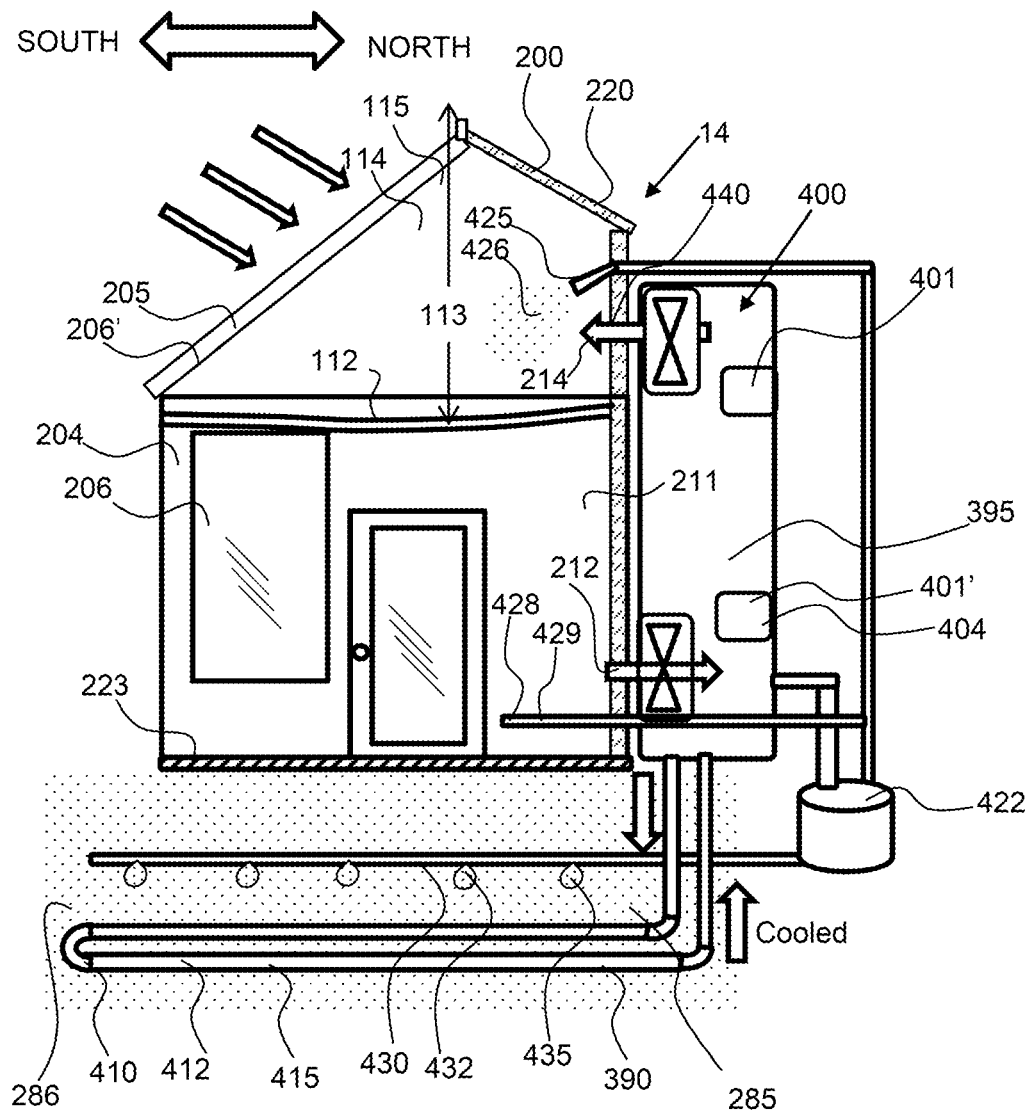
FIG. 18 shows a side view of an enclosure and a multi-source ground-to-air heat exchange system configured to regulate the temperature and humidity within the enclosure by, in part, a fluid-to-ground heat exchanger that produces a flow of thermal exchange fluid in the ground loop, with a heat reservoir condensate hydration system and with a condensate make-up irrigation/fertigation system.

As shown in FIG. 18, an exemplary multi-source ground-to-air heat exchange system 14 is configured to regulate the enclosure air 211 temperature and humidity utilizing a fluid-to-air heat exchange system 400 that exchanges heat with a ground loop 410 and ground heat exchanger 390 of the water to ground heat exchanger system 395 to store the heat for later use in a heat reservoir 285 when the temperature drops within the enclosure 200. The enclosure 200 shown is a greenhouse enclosure 220 having windows 206-206' on the wall 204 and on the roof 205 of the enclosure. The enclosure is being cooled by the intake air 212 from with the enclosure, which is hot and humid being drawn into the fluid-to-air heat exchange system 400, and the output air 214 from the heat exchanger into the enclosure being cool and dry. Also, the enclosure is being humidified by the spray of a mist 426 of water from misters 425. The misters may receive condensate water 422 from heat pump 401 that removes moisture from the enclosure air. This condensate water may be used in an irrigation system 428 that dispenses the condensate water through irrigation conduits 429 to vegetation in the enclosure. The condensate water may be heated by a heat exchange coupled with the heat pump system. A hydration conduit 430 may also receive condensate water 422 and this may be used as hydration fluid 435 that is dispensed to the heat reservoir 285 via the hydration condensate conduit 430 through hydration condensate outlets 432. It may be important to maintain a moisture content in the heat reservoir 285, such as about 20% or more moisture content, or about 30% or more. If too dry, then the thermal energy exchange may not be effective between the ground loop conduits 412 and the thermal exchange fluid therein 415 and the heat reservoir. The ground loop heat exchanger may absorb heat from the fluid-to-air heat exchange system 400, such as from the condenser heat exchanger 404 of a heat pump 401. The heat absorbed by the thermal exchange fluid 415 may then be transferred and stored in the heat reservoir medium 286 of the heat reservoir 285 for heating the enclosure when required. A ground to air heat exchange system 210, as described herein and as shown in FIG. 19, may be also integrated with the system shown in FIG. 18.

Figure 23:
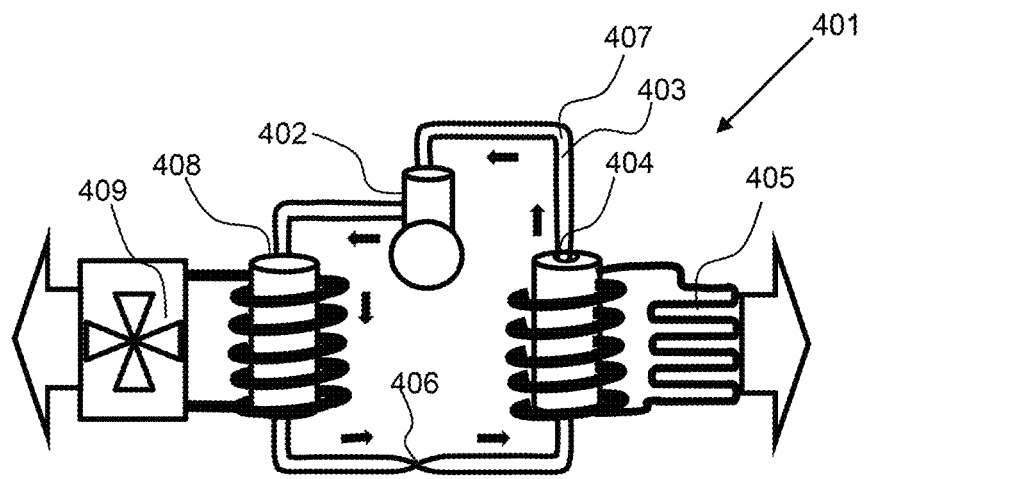
FIG. 23 shows a diagram of a heat pump operating in a heating mode.

As shown in FIG. 18 with reference to FIG. 4, a canopy 112 may be configured to extend across the greenhouse enclosure 220, proximal the top, to effectively create an air-exchange plenum 114 between said canopy and the ceiling or roof 205 which forming the top portion of the plenum. The canopy may be a deployable shade canopy that is used during the day to reduce sunlight in the greenhouse and onto the vegetation. A canopy may be configured a canopy offset distance 113 from the roof of the greenhouse and may comprise one or more layer. The canopy may be a fabric and two layers may be configured with a gap therebetween for insulation purposes. This plenum may be used to cool air when the outside temperature is low, such as at night. The roof of the greenhouse enclosure may be a material that has high thermal conductivity, such as metal or may comprise one or more air-exchange vents 115 that can be opened to enable external air exchange with the air-exchange plenum. Air from the GHAT system or from the heat pump system may flow through this plenum and be cooled and may be directed or used to cool the heat reservoir 285. In the case of an airflow from the GHAT system, the airflow may flow from the air-exchange plenum, where it is cooled, through the GHAT system 210, such as through the manifold, as shown in FIG. 19. This cooled flow of air from the air-exchange plenum may cool the heat reservoir 285 so that is can absorb more heat the following day. Airflow from the air-exchange plenum may also be used to flow over a heat exchanger of one of the heat pump heat exchange systems, such as over a condenser heat exchanger 404, 405 as shown in FIGS. 20 and 23.

Figure 19:
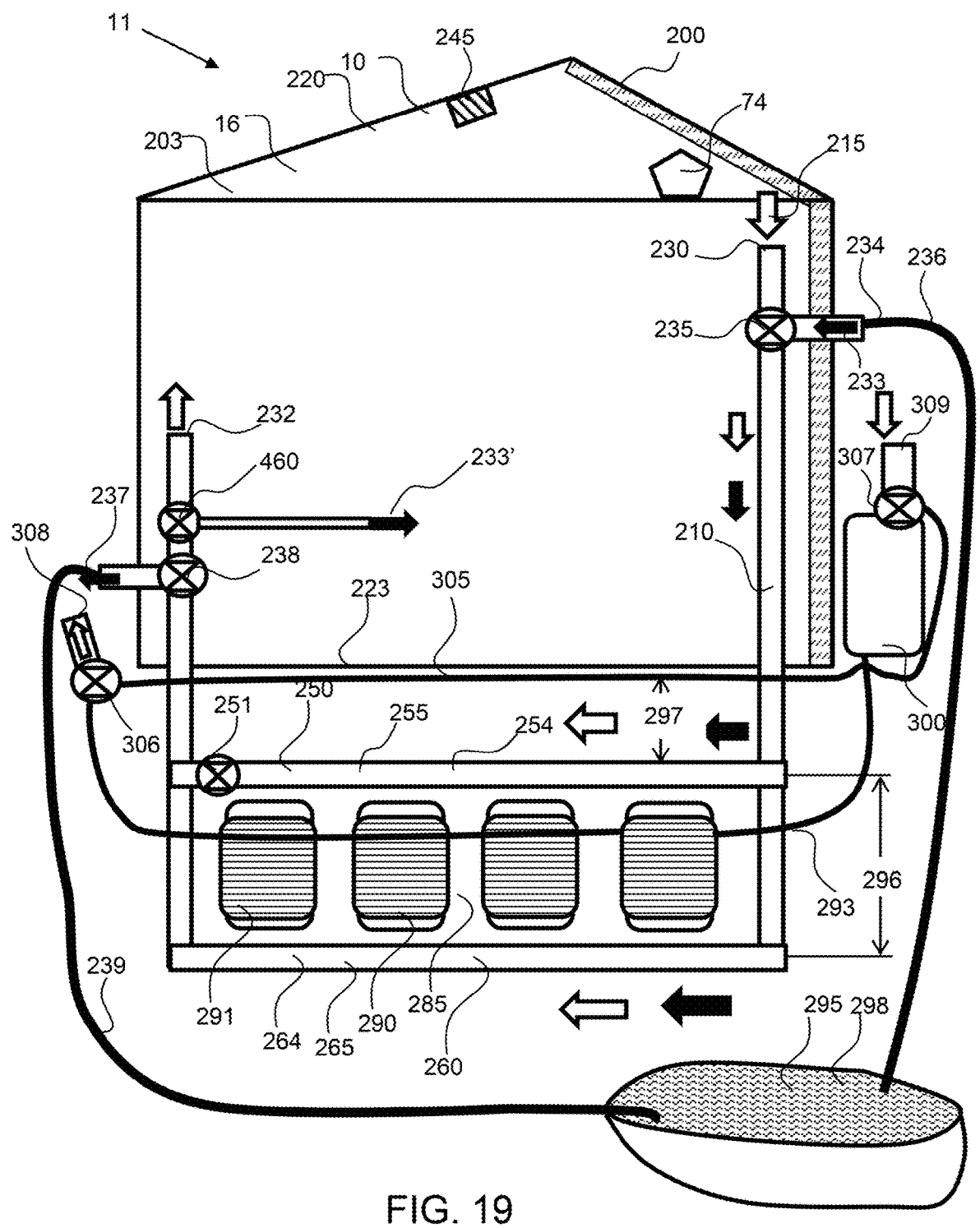
FIG. 19 shows a cross sectional view of a greenhouse having a GHAT system that includes a body of water for providing an external fluid that can be directed through the manifolds or used as the thermal medium that flows through the thermal medium conduit to the thermal reservoir heat exchanger.
Figure 20:
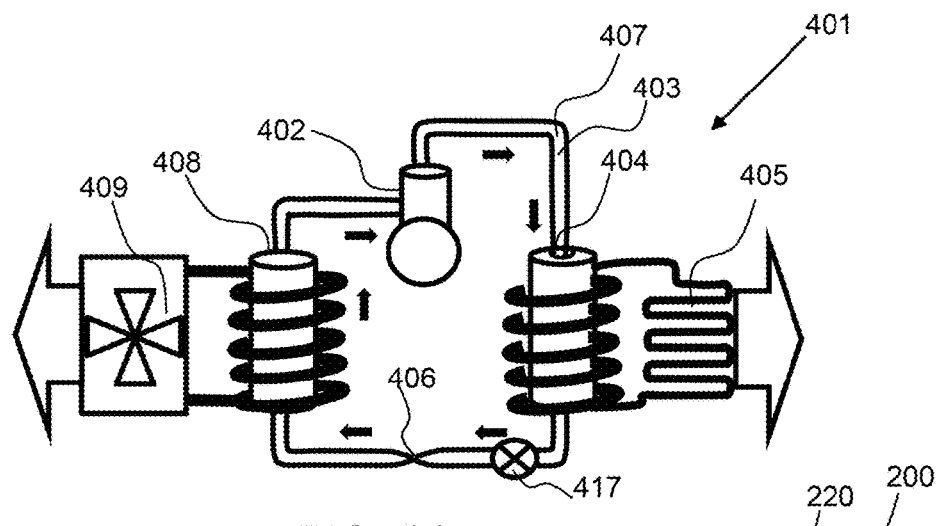
FIG. 20 shows a diagram of a heat pump operating in a cooling mode.

As shown in FIG. 19, an exemplary enclosure temperature regulation system 11 utilizes a ground to air heat transfer (GAHT) system 210 having a bypass inlet valve 235 that can switch inlet flow into the GAHT system from an enclosure GAHT inlet 230, that draws air from within the greenhouse enclosure 202, to an external GAHT inlet 234, that draws fluid, such as air or water, from outside of the enclosure, or external air. The external GAHT inlet is configured on the north side of the enclosure to preferentially draw in cooler air for greenhouse applications, but may be configured on any side of the enclosure. Likewise, a bypass outlet valve 238 can switch outlet flow, or return flow, from an enclosure GAHT outlet 232 to an external GAHT outlet 237. The external fluid 298 drawn into GAHT system may be water and an external fluid conduit 236 may provide water or other fluid to the external GAHT inlet 234, such as from a water supply line, or from a body of water 295 including a man-made or natural water source, such as a pond or lake. An external fluid conduit 236 extends from the body of water 295 to the external GAHT inlet 234 and an external fluid return conduit 239 may extend from the external outlet 237 back to the body of water or may extend directly back to external GAHT inlet 234, thereby forming a loop for the external fluid to flow through the GAHT system. The body of water may be configured at least partially under the enclosure and in thermal communication with the heat reservoir. The water may more quickly and effectively change the temperature of the heat reservoir. Furthermore, the water may flow through valves or openings in the GAHT manifolds to change the thermal conductivity and heat capacity of the heat reservoir. The external outlet may return the fluid, such as water, back to the source, through external fluid return conduit 239 thereby forming an external a loop. The inlet valve 235 may switch inlet flow into the GAHT system from return air 215, from the enclosure, to external fluid 233, which may be external air or external fluid as required to control the enclosure temperature and to manage the heat reservoir condition, such as thermal conductivity and heat capacity.

The GAHT may further comprise an irrigation valve 460 that is configured proximal to the enclosure GAHT outlet 232 and configured to direct a flow of external fluid 233' into the greenhouse enclosure 202, such as a greenhouse 10 enclosure for irrigation of plants therein. The external fluid may be water that is cooled or heated by flowing through the GAHT manifold, or heated or cooled by an auxiliary source such as a hot water heater or refrigeration system, respectively. External fluid may be condensate water from the evaporator of the heat pump system and any of the external fluid, or water may be heated in a heat exchanger of the multi-source fluid-to-air heat exchange system.

The GAHT may further comprise a condensate valve 251 that is configured with the GAHT manifold to release condensate or condensed water within the GAHT system. The condensate may be dispensed through the condensate valve into the heat reservoir 285 to change the thermal conductivity, heat capacity and/or temperature of the heat reservoir. A controller 74 may control the release of the condensate based on the temperature of the heat reservoir, internal temperature of the enclosure and expected changes in outside temperature. The GAHT manifold may comprise condensate apertures 255, 265 to release condensate with the manifold. The apertures may be configured in the upper manifold and/or the lower manifold The external fluid may be water that is cooled or heated by flowing through the GAHT manifold, or heated or cooled by an auxiliary source such as a hot water heater or refrigeration system, respectively.

As shown in FIGS. 19, an exit vent 245 is configured proximal to the top of the enclosure and is configured to allow enclosure gas or air to vent to the outside when a threshold positive pressure is reached within the enclosure. This vent may be a self-opening vent having louvers that open when a threshold positive pressure is reached.

For example, when the heat reservoir is too hot or too cold, the bypass inlet and outlet valves can be switched to draw in outside air from the enclosure to exchange heat with the heat reservoir. Also shown in FIG. 14 is the thermal medium system with a thermal medium inlet 309 that receives thermal medium into the thermal medium reservoir 300 and a thermal medium inlet valve 307 to switch from the thermal medium return conduit 305 to the thermal medium inlet, which may receive thermal medium from another source, such as from a municipal water supply or a body of water, natural or manmade, for example. Also, a thermal medium outlet valve 306 is configured to switch the flow of thermal medium from the thermal medium return conduit to a thermal medium outlet 308. The water received into the external GAHT inlet may be heated or cooled, such as being heated by a hot water heater or cooled by a refrigeration system. The thermal medium outlet may be coupled with irrigation for the greenhouse plants or may be used for other purposes, such as biomass treatment.

The manifold offset distance 259 is shown between the upper manifold 250 and the lower manifold 260. The upper manifold may be configured a depth 258 below the floor 223 of the enclosure 200, such as the greenhouse enclosure 202. The manifolds extend horizontally under the enclosure floor 223, wherein in this embodiment the extension conduits are substantially parallel with the horizontal floor of the enclosures, or within about 20 degrees or less, preferably within about 10 degrees and even more preferably with 5 degrees or less of the floor or with respect to horizontal. This depth 258 may be about 0.25 m or less, about 0.5 m or less about 1 m or less, about 2 m or less, about 3 m or less and any range between and including the upper manifold depths provided. The closer the upper manifold is to the floor of the enclosure, the better the heat transfer may be between the GAHT or heat reservoir and the floor of the enclosure. The greenhouse enclosure 202 has a roof 16, a GAHT system 210, and a thermal medium system 291.

Figure 21:
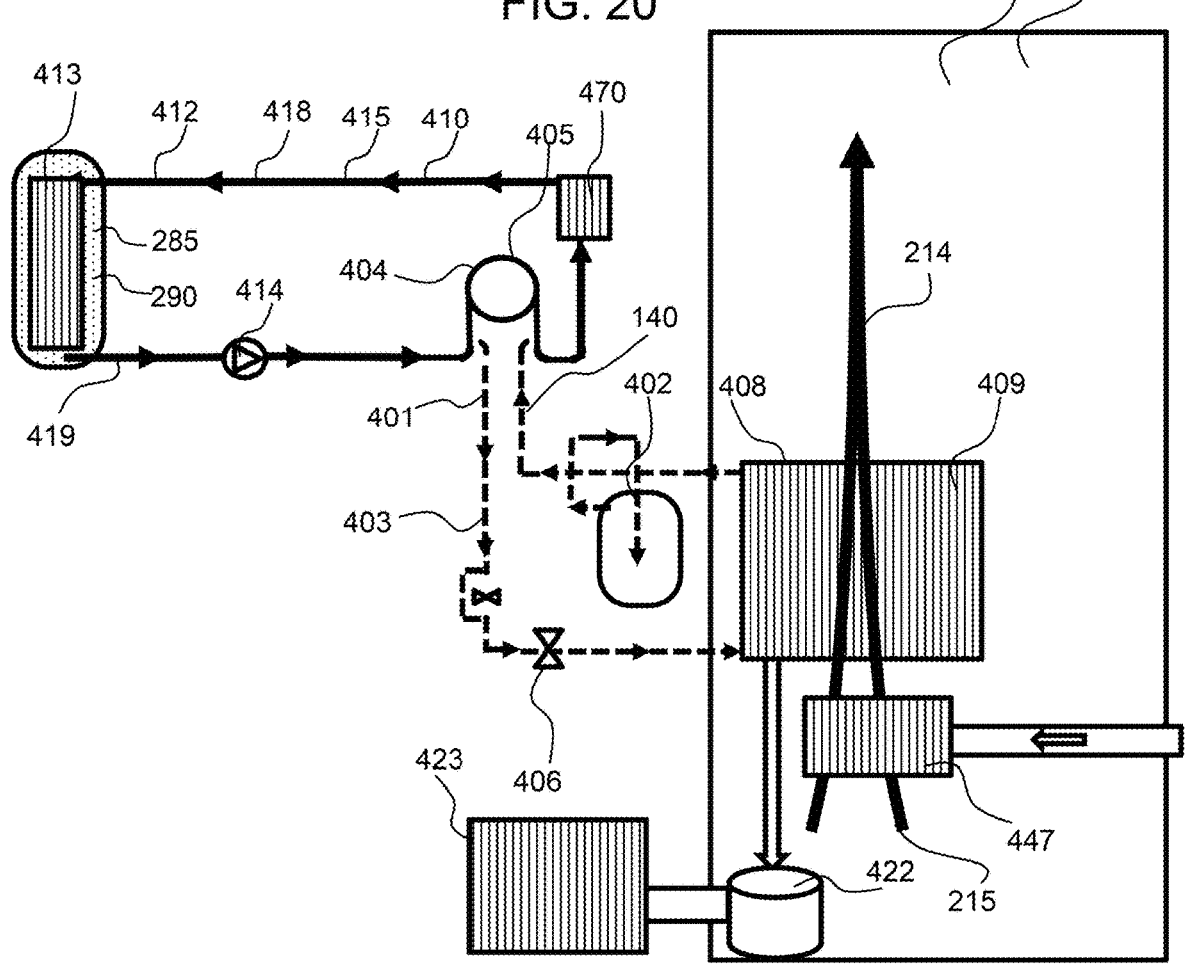
FIG. 21 shows a heat exchange system of a multi-source ground-to-air heat exchange system that utilizes a heat pump.

Referring now to FIGS. 20 to 22, a fluid-to-air heat exchange system 400 employs a heat pump 401 operating in a cooling mode. The refrigerant 407 is compressed in a compressor 402 and then condensed in a condenser having a condenser heat exchanger 404, wherein heat may be expelled and absorbed by the thermal exchange fluid 415 of the ground loop 410 and ground heat manifold 413. The condensed refrigerant may then flow through an expansion valve 406 before proceeding to the evaporator heat exchanger 409 to cool and dehumidify the intake air 212 to produce output air 214 that is directed into the enclosure to cool the enclosure 202. As shown in FIG. 22, a dehumidification system 420 is configured with the evaporator 409 to produce condensate. Return air 215 passes over the evaporator and is cooled by the evaporator. The hot water or refrigerant reheat coil 411 reheats the air from the evaporator coil 409 to produce discharge air 214 before discharge to the enclosure 202.

As shown in FIG. 21, the condensate water 422 may be configured to flow through a condenser-ground loop heat exchanger 470 to warm up the condensate water prior to irrigation or misting into the enclosure, as shown in FIG. 18 and to cool the thermal exchange fluid 415, such as prior to flowing through the ground loop. The condenser-ground loop heat exchanger may be a cross flow heat exchanger wherein the flow of the thermal exchange fluid 415 is opposite the flow of the condensate water through the condenser-ground loop heat exchanger. Also a condensate heat exchanger 423 may be configured to exchange heat with condensate water prior to the condensate being used to flow through the condenser-ground loop heat exchanger 470, or before being used directly for irrigation or misting into the greenhouse enclosure 220.

As shown in FIG. 21, a water side economizer 447 is configured as a heat exchanger to exchange heat with the return air 215 from the enclosure before entering the heat pump, such as entering into the evaporator 409. The water side economizer is a heat exchanger that may use water from a natural source, or natural body of water as described herein to provide cooling or heating of the enclosure air before return to the heat pumps.

Figure 24:
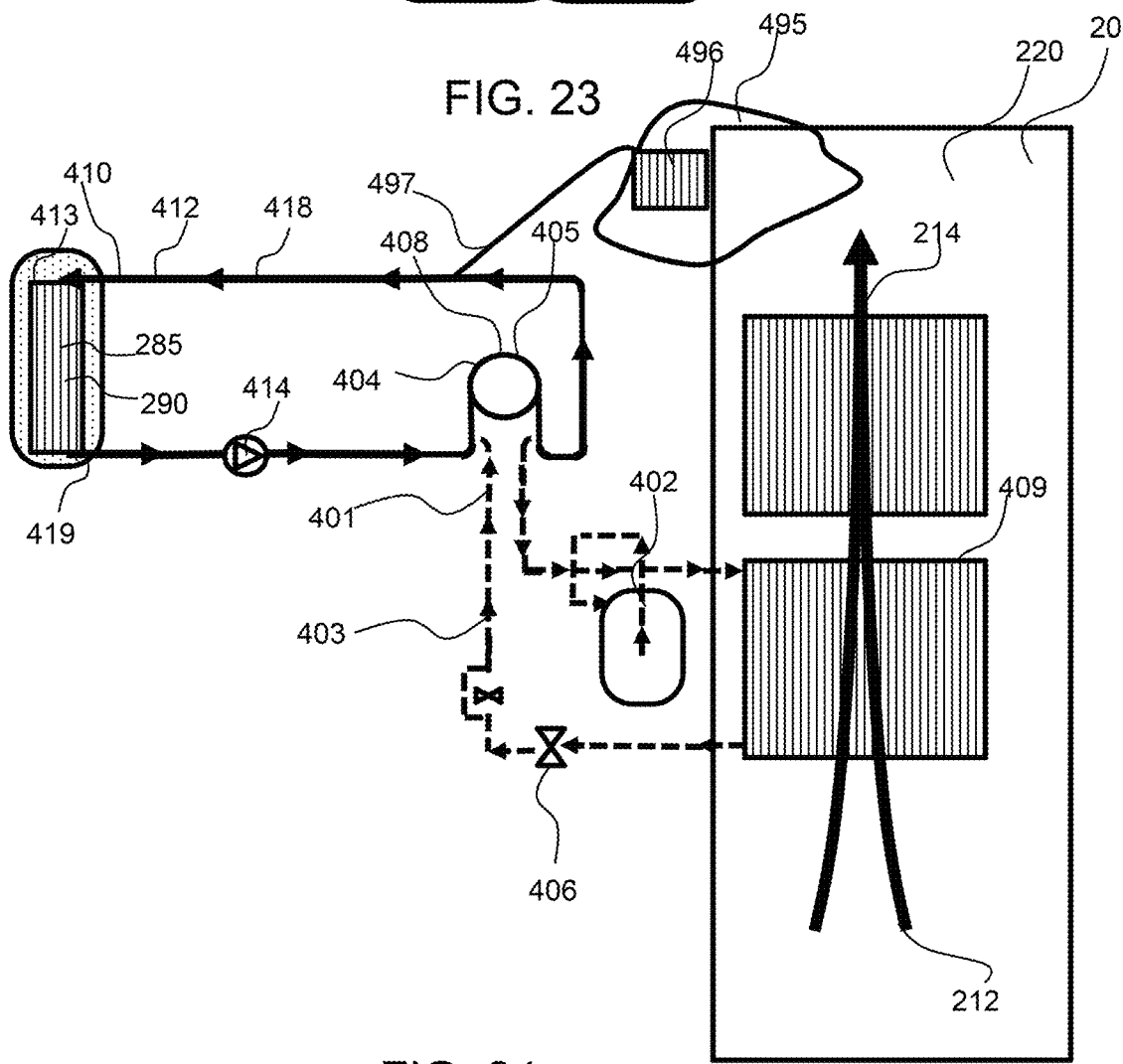
FIG. 24 shows a fluid-to-air heat exchange system that utilizes a heat pump.

Referring now to FIGS. 23 and 24, an exemplary fluid-to-air heat exchange system 400 is a heat pump 401 operating in a heating mode. The refrigerant 407 is compressed in a compressor 402 and then condensed in a condenser having a condenser heat exchanger 405, wherein heat may be expelled and absorbed by the intake air 212 to produce output air 214, that is heated and directed into the enclosure to heat the enclosure. The condensed refrigerant may then flow through an expansion valve 406 before proceeding to the evaporator 408 having an evaporator heat exchanger 409 to cool the thermal exchange fluid 415 of the ground loop 410 ground heat manifold 413.

Referring now to FIGS. 25 to 28, a ground loop 410 may be configured under a floor 223 of an enclosure 200, such as a greenhouse enclosure 220 and within a heat reservoir 285 as described herein. The ground loop may include a ground loop conduit 412 that extends through the heat reservoir for exchanging heat between the thermal exchange fluid flowing through the ground loop conduit and the heat reservoir medium 286. A plurality of ground loop conduits may extend from a thermal exchange fluid output conduit 418 to a thermal exchange fluid return conduit 419 to create a ground loop manifold 413. The ground loop may have a ground loop density of outer surface area of the ground loop conduit(s) over the surface area of heat reservoir medium 285.

Figure 25:
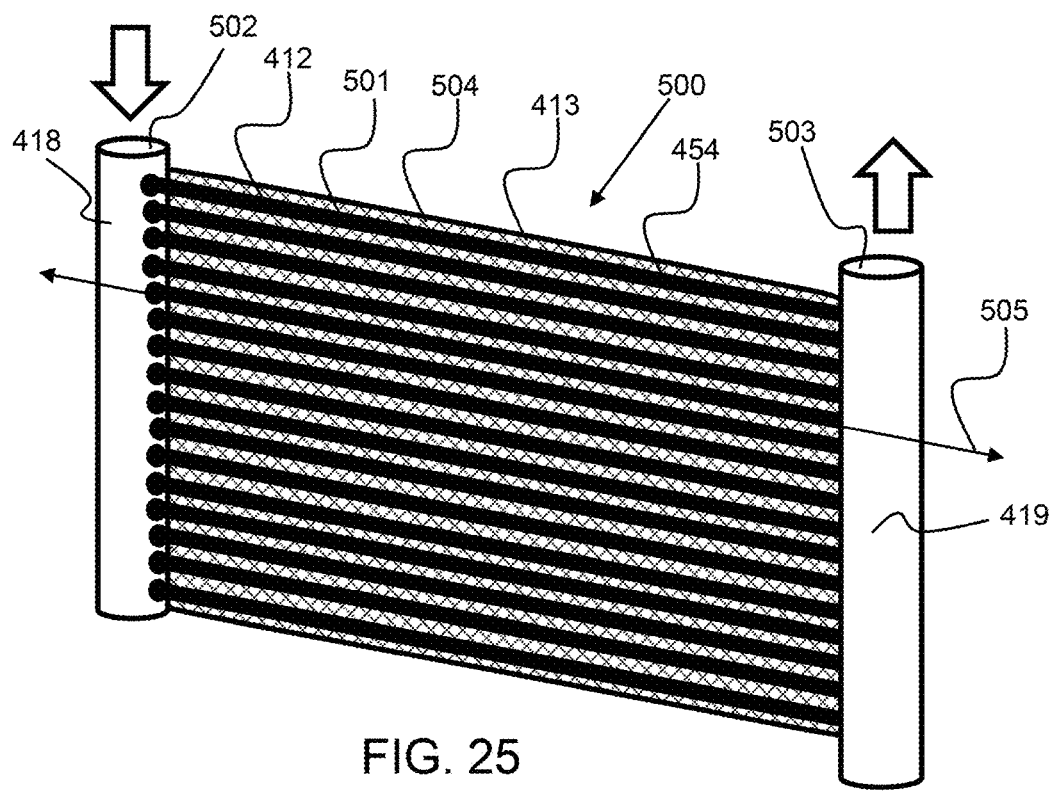
FIG. 25 shows a perspective view of a portion of an exemplary ground loop manifold having a plurality of extension conduits configure between an inlet conduit and outlet conduit.

FIG. 25 shows a perspective view of a portion of a ground loop manifold 413, a ground loop mat 500, that comprises a plurality of mat extension conduits 501 that extend from a mat inlet conduit 502 to a mat outlet conduit 503 along the plane of the mat. The extension conduits may be coupled together by a mat conduit connector 503, such as a net of material to allow heat transfer between the mat extension conduits and the heat reservoir. The gap distance between mat extension conduits and the diameter of the mat extension conduits may be selected to provide efficient heat transfer with the heat reservoir. Also, the mat extension conduits may be flexible wherein the mat extension conduits are polymeric in material or comprise a polymer. One or more ground loop mats may be configured under the floor of the enclosure, or at least partially configured under the floor of the enclosure, and may be configured with the plane of the mat extending substantially horizontally, substantially vertically or in a wave configuration. The orientation of the ground loop mats may be selected based on the environmental conditions, or climate, and the type of heat reservoir used. Very cold climates may require the ground loop mats be configured a greater ground loop depth below the floor of the enclosure. A wave configuration may improve heat transfer with the heat reservoir. The inlet and outlet conduits may form a portion of the ground loop inlet and outlet conduits, respectively.

Figure 26:
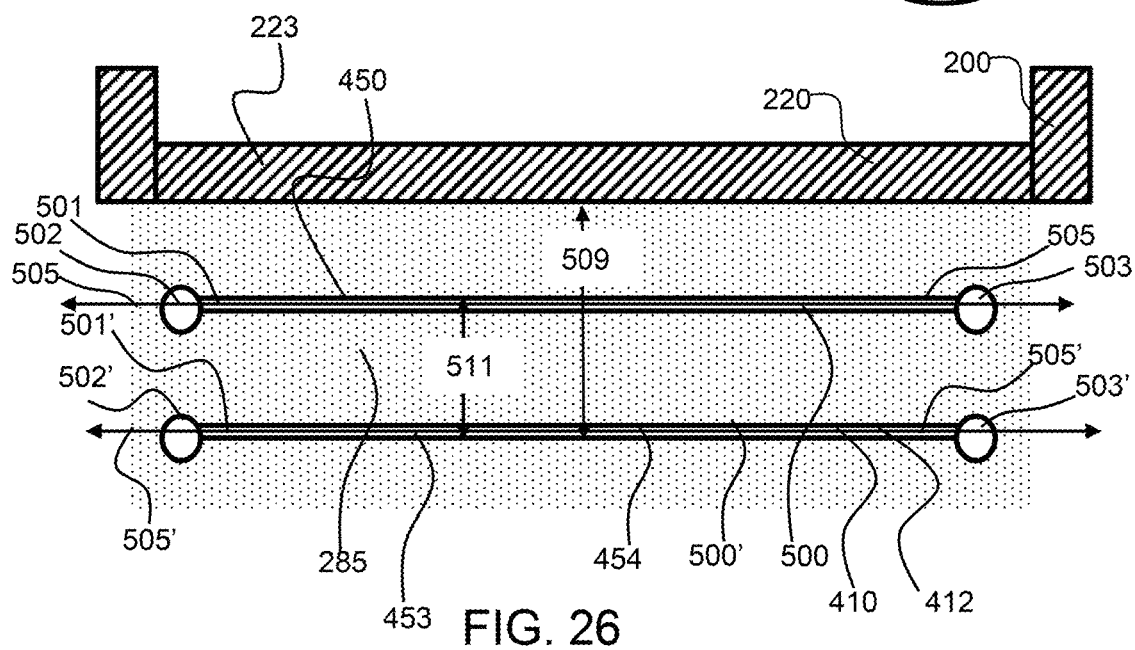
FIG. 26 shows a side cross sectional view of a pair of ground loop mats configured substantially horizontally under the floor of the greenhouse enclosure.

A shown in FIG. 26, a pair of ground loops mats 500, 500' are configured substantially horizontally under the floor of the greenhouse enclosure 220, wherein the mat extension conduits 501, 501' extend in a plane 505 from the mat inlet conduit 502 to the mat outlet conduit 503 that is within at least 20 degrees or horizontal and preferably within about 10 degrees of horizontal. The lower manifold 453 or deeper ground loop mat is configured a ground loop depth 509 below the floor 223 of the greenhouse enclosure 200. The upper manifold 450, or ground loop mat is configured a ground loop offset distance 511 from the lower ground loop mat. This offset distance may be configured to effectively enable heat transfer between the extension conduits and the heat reservoir, such as about 30 cm or more, about 75 cm or more, about 1 m or more, about 1.5 m or more and any range between and including the values provided. Any number of ground loop mats may be configured under the floor of the enclosure to increase the ground loop thermal exchange area density. Again, a ground loop mat has a plurality of extension conduits that are coupled together, such as by a netting, fabric and the like.

Figure 27:
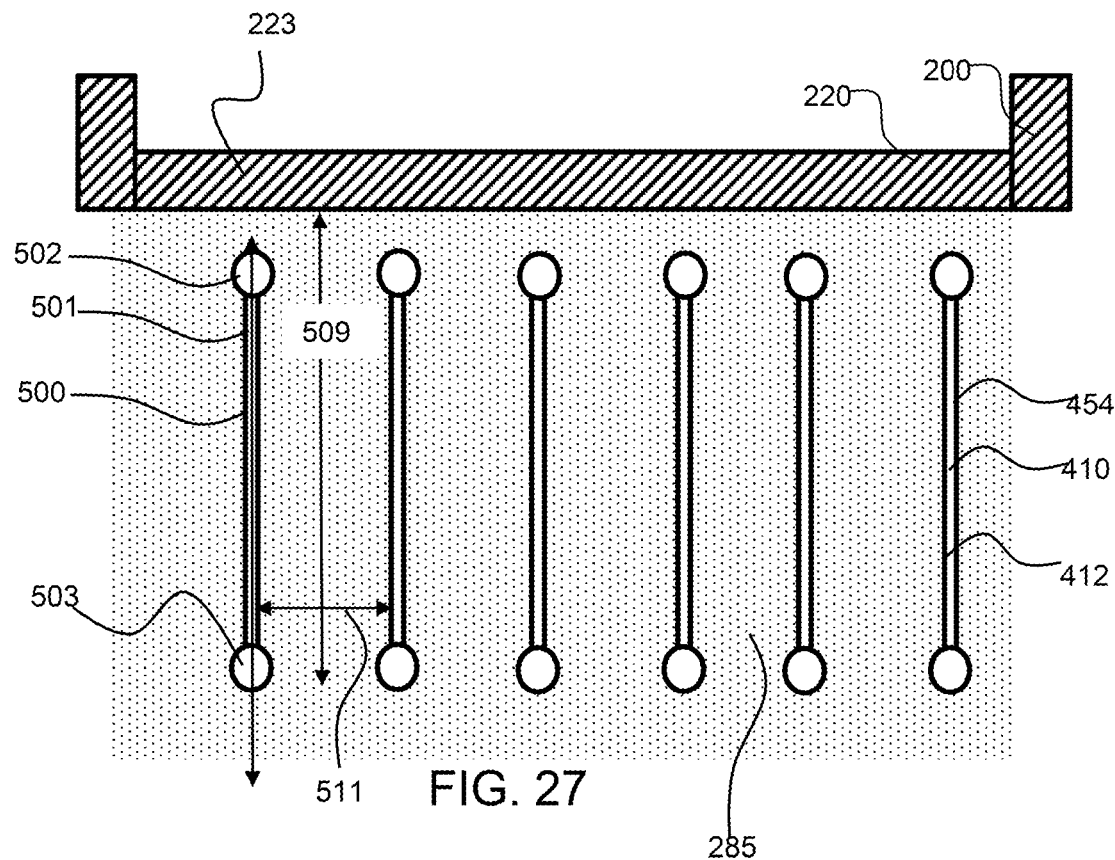
FIG. 27 shows a cross sectional view of a plurality of ground loop mats configured substantially vertically under the floor of the greenhouse enclosure.

As shown in FIG. 27, a plurality of ground loops mats 500, are configured substantially vertically, wherein the mat extension conduits 501, extend in a plane 505 from the mat inlet conduit 502 to the mat outlet conduit 503 that is within at least 20 degrees or vertical and preferably within about 10 degrees of vertical. The bottom of the ground loop mat is configured a ground loop depth 509 below the floor 223 of the greenhouse enclosure 200. The ground loop mats are configured with a ground loop offset distance 511 therebetween. The ground loop depth may be no more than about 4 m, no more than about 3 m, no more than about 2 m, no more than about 1 m and any range between and including the depths provided. The ground loop depth may be about the same depth as the foundation of the enclosure, because of structural considerations for the foundation of the enclosure.

Figure 28:
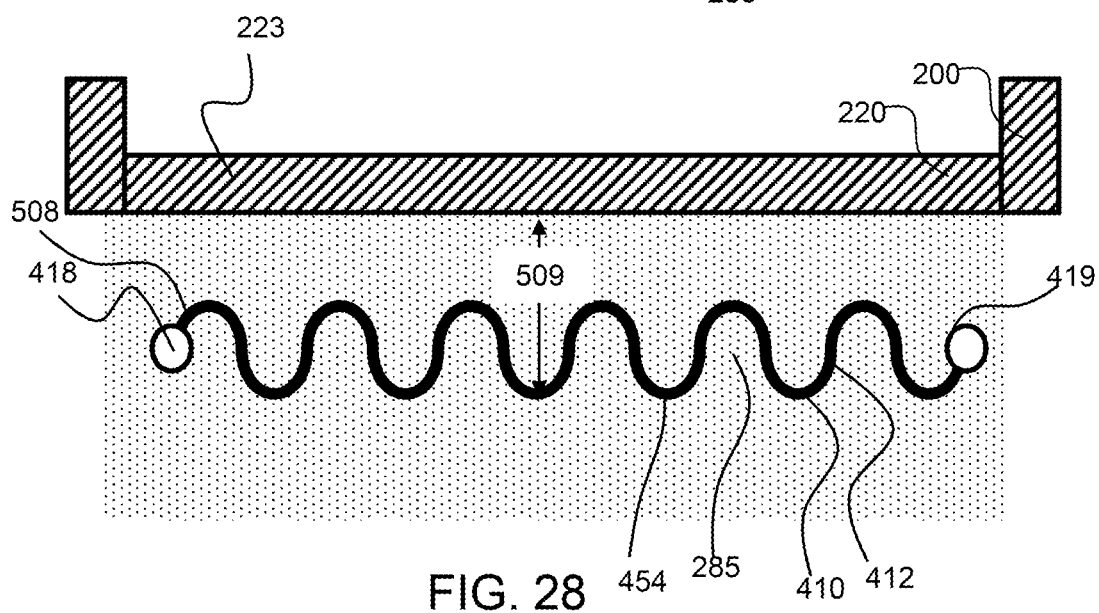
FIG. 28 shows a side cross sectional view of a ground loop configured under the floor of the greenhouse enclosure with the extension conduits configured with undulations or with a wave between the thermal exchange fluid outlet conduit and the thermal exchange fluid return conduit.

As shown in FIG. 28, a ground loop 410 is configured with an extension conduit 454 that is an undulating extension conduit 508 having an undulating or wave pattern between the thermal exchange fluid outlet conduit 418 and the thermal exchange fluid return conduit 419. As discussed, this may provide more surface area of the conduits within a volume of heat reservoir and may improve heat transfer effectiveness. These undulating extension conduits may have an inner diameter of about 25 mm or more, about 30 mm or more, about 35 mm or more and any range between and including the diameters provided.

Figure 29:
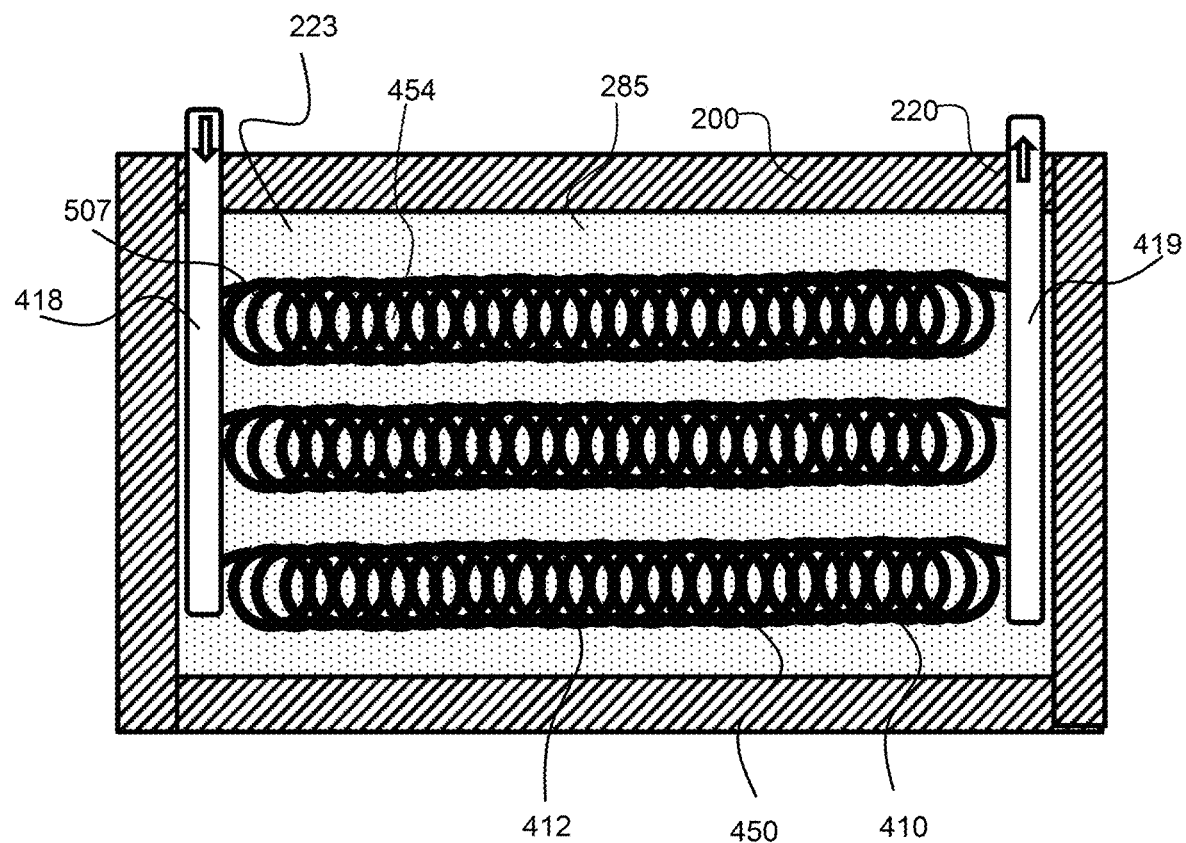
FIG. 29 shows a top-down cross sectional view of a ground loop configured under the floor of the greenhouse enclosure with the extension conduits configured as coil extension conduits configured with a plurality of coil between the thermal exchange fluid outlet conduit and the thermal exchange fluid return conduit.

As shown in FIG. 29 shows a top down cross sectional view of a ground loop 410 configured under the floor 223 of the greenhouse enclosure with the extension conduits 454 configured as coil extension conduits 507 configured with a plurality of coil between the thermal exchange fluid outlet conduit 418 and the thermal exchange fluid return conduit 419. As shown three separate coil extension conduits 507 extend from the thermal exchange fluid outlet conduit 418 and the thermal exchange fluid return conduit 419. Each coil may have a diameter or width of about 0.5 m or more, about 1 m or more, about 1.5 m or more and any range between and including the diameters of the coils provided. These three coil extension conduits may from an upper manifold 450 and one or more manifolds may be configured below this upper manifold, as generally shown in FIG. 26.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A greenhouse enclosure environment control system comprising a multi-source ground-to-air heat transfer system comprising of:
   a) an enclosure comprising:
      i) a roof;
      ii) a floor;
      iii) vegetation configured within the greenhouse;
   b) a heat reservoir having a heat reservoir medium;
   c) a heat pump heat exchange system comprising a heat pump comprising:
      i) a condenser;
      ii) a condenser heat exchanger;
      iii) an expansion valve;
      iv) an evaporator heat exchanger that produces condensate water from a flow of air from the enclosure;
      v) a compressor configured to pump a refrigerant through the heat pump exchange system; and
      vi) a reversing valve;
   d) a misting system configured to dispense a mist of water into the enclosure;
   e) a fluid-to-ground heat exchange system comprising:
      i) a ground loop coupled with the heat pump exchange system and comprising:
         a ground loop conduit extending through the heat reservoir; and
      ii) a ground loop pump;
      iii) a thermal exchange fluid that is configured to be pumped by the ground loop pump to flow through the ground loop conduit and back to said heat pump heat exchange system;
   f) a hydration conduit that extends under the enclosure having a hydration outlet to dispense a hydration fluid to the heat reservoir medium to increase the heat transfer of the heat reservoir medium;
   wherein, in a cooling and dehumidification mode, the evaporator heat exchanger produces a flow of cooled and dried air into the enclosure and the compressor heats the thermal exchange fluid flowing to the ground loop conduit, whereby the thermal reservoir medium is heated and the enclosure is cooled and dehumidified; and
   wherein in a heating mode, the evaporator heat exchanger produces a flow of heated air into the enclosure and the condenser cools the thermal exchange fluid flowing to the ground loop conduit, whereby the heat reservoir is cooled and the enclosure is heated.

2. The greenhouse enclosure environment control system of claim 1, wherein the enclosure has an exposed surface area with at least 25% windows to allow sunlight into the enclosure for the purpose of growing the vegetation.

3. The greenhouse enclosure environment control system of claim 1, wherein the heat pump further comprises a reheat coil.

4. The greenhouse enclosure environment control system of claim 1, wherein the heat reservoir is configured at least partially under the floor of the greenhouse enclosure.

5. The greenhouse enclosure environment control system of claim 4, wherein the ground loop is configured substantially under the enclosure, wherein at least 75% of the ground loop is configured under the enclosure.

6. The greenhouse enclosure environment control system of claim 4, wherein the ground loop comprises a ground-loop manifold comprising:
   an inlet conduit;
   an outlet conduit;
   a plurality of ground loop conduits that each extend from the inlet conduit to the outlet conduit of the ground-loop manifold.

7. The greenhouse enclosure environment control system of claim 6, wherein the ground loop comprises at least 20 extension conduits.

8. The greenhouse enclosure environment control system of claim 6, wherein the plurality of said extension conduits extends within 20 degrees of horizontal from the inlet conduit to the outlet conduit of the ground loop manifold.

9. The greenhouse enclosure environment control system of claim 6, wherein the ground loop manifold is a ground-loop mat, wherein the plurality of said extension conduits are coupled together.

10. The greenhouse enclosure environment control system of claim 9, wherein the ground-loop mat extends within 20 degrees of horizontal.

11. The greenhouse enclosure environment control system of claim 9, wherein ground loop comprises a first ground-loop mat and a second ground loop mat that each extend within 20 degrees of horizontal.

12. The greenhouse enclosure environment control system of claim 11, wherein the first and second ground-loop mats extends no more than 4 m under the enclosure.

13. The greenhouse enclosure environment control system of claim 6 wherein the ground loop extends no more than 2 m under the enclosure.

14. The greenhouse enclosure environment control system of claim 1, wherein the heat reservoir medium comprises fill sand.

15. The greenhouse enclosure environment control system of claim 3, wherein reheat coil heats a flow of air from the evaporator heat exchanger to produce said flow of heated air into the enclosure.

16. The greenhouse enclosure environment control system of claim 1, further comprising a fluid cooler to cool the thermal exchange fluid.

17. The greenhouse enclosure environment control system of claim 1, further comprising a fluid heater to heat the thermal exchange fluid.

18. The greenhouse enclosure environment control system of claim 1, wherein said condensate water from the heat pump heat exchange system is used for at least one of the misting system or for irrigation of the vegetation within the greenhouse enclosure.

19. The greenhouse enclosure environment control system of claim 1, wherein the hydration fluid comprises said condensate water.

20. The greenhouse enclosure environment control system of claim 1, wherein the misting system uses the condensate water from the the heat pump heat exchange system.

21. The greenhouse enclosure environment control system of claim 1, wherein the condensate water is used for irrigation of the vegetation within the greenhouse enclosure.

22. The greenhouse enclosure environment control system of claim 1, wherein the greenhouse enclosure environment control system is substantially self-contained wherein at least 50% of air within the enclosure is circulated from the enclosure through the heat pump exchange system and back into the enclosure.

23. The greenhouse enclosure environment control system of claim 1, wherein the ground loop heat exchanger has a thermal exchange area density ratio of at least 1.5 $m^2/m^2$.

24. The greenhouse enclosure environment control system of claim 1, further comprising a cooling plenum system comprising:
   a) a canopy configured a plenum offset distance from the roof of the enclosure; wherein airflow from heat pump heat exchange system is pumped through the canopy to exchange heat with the roof.

25. The greenhouse enclosure environment control system of claim 1, further comprising a mixing plenum configured to receive enclosure air and outside air for mixing and providing to the heat pump.

26. A greenhouse enclosure environment control system comprising a multi-source ground-to-air heat transfer system comprising of:
   a) an enclosure comprising:
      i) a roof;
      ii) a floor;
      iii) vegetation configured within the greenhouse;
   b) a heat reservoir having a heat reservoir medium;
   c) a heat pump heat exchange system comprising a heat pump comprising:
      i) a condenser;
      ii) a condenser heat exchanger;
      iii) an expansion valve;
      iv) an evaporator heat exchanger that produces condensate water from a flow of air from the enclosure;
      v) a compressor configured to pump a refrigerant through the heat pump exchange system; and
      vi) a reversing valve;
   d) a misting system configured to dispense a mist of water into the enclosure;
   e) a fluid-to-ground heat exchange system comprising:
      i) a ground loop coupled with the heat pump exchange system and comprising:
         a ground loop conduit extending through the heat reservoir; and
      ii) a ground loop pump;
      iii) a thermal exchange fluid that is configured to be pumped by the ground loop pump to flow through the ground loop conduit and back to said heat pump heat exchange system;
   f) a water side economizer that comprises a heat exchanger configured to exchange heat with the enclosure air prior to the enclosure air returning to the heat pump;
   wherein, in a cooling and dehumidification mode, the evaporator heat exchanger produces a flow of cooled and dried air into the enclosure and the compressor heats the thermal exchange fluid flowing to the ground loop conduit, whereby the thermal reservoir medium is heated and the enclosure is cooled and dehumidified; and
   wherein in a heating mode, the evaporator heat exchanger produces a flow of heated air into the enclosure and the condenser cools the thermal exchange fluid flowing to the ground loop conduit, whereby the heat reservoir is cooled and the enclosure is heated; and
   wherein said condensate water from the heat pump heat exchange system is used for at least one of the misting system or for irrigation of the vegetation within the greenhouse enclosure.

27. The greenhouse enclosure environment control system of claim 26, wherein the water side economizer receives water into the heat exchanger from a body of water.

28. A greenhouse enclosure environment control system comprising a multi-source ground-to-air heat transfer system comprising of:
   a) an enclosure comprising:
      i) a roof;
      ii) a floor;
      iii) vegetation configured within the greenhouse;
   b) a heat reservoir having a heat reservoir medium;
   c) a heat pump heat exchange system comprising a heat pump comprising:
      i) a condenser;
      ii) a condenser heat exchanger;
      iii) an expansion valve;

iv) an evaporator heat exchanger that produces condensate water from a flow of air from the enclosure;
v) a compressor configured to pump a refrigerant through the heat pump exchange system; and
vi) a reversing valve;
d) a misting system configured to dispense a mist of water into the enclosure;
e) a fluid-to-ground heat exchange system comprising:
i) a ground loop coupled with the heat pump exchange system and comprising:
a ground loop conduit extending through the heat reservoir; and
ii) a ground loop pump;
iii) a thermal exchange fluid that is configured to be pumped by the ground loop pump to flow through the ground loop conduit and back to said heat pump heat exchange system;
wherein the thermal exchange fluid is diverted to a body of water and flows through an auxiliary heat exchanger to cool the thermal exchange fluid;
wherein, in a cooling and dehumidification mode, the evaporator heat exchanger produces a flow of cooled and dried air into the enclosure and the compressor heats the thermal exchange fluid flowing to the ground loop conduit, whereby the thermal reservoir medium is heated and the enclosure is cooled and dehumidified; and
wherein in a heating mode, the evaporator heat exchanger produces a flow of heated air into the enclosure and the condenser cools the thermal exchange fluid flowing to the ground loop conduit, whereby the heat reservoir is cooled and the enclosure is heated; and
wherein said condensate water from the heat pump heat exchange system is used for at least one of the misting system or for irrigation of the vegetation within the greenhouse enclosure.

29. The greenhouse enclosure environment control system of claim 28, wherein the body of water that is configured below ground.

30. The greenhouse enclosure environment control system of claim 1, wherein the heat reservoir includes phase change material.

31. The greenhouse enclosure environment control system of claim 30, wherein the phase change material is configured under the floor of the greenhouse enclosure.

32. The greenhouse enclosure environment control system of claim 30, wherein the phase change material is configured in a thermal reservoir.

33. The greenhouse enclosure environment control system of claim 32, wherein the ground loop extends to a thermal reservoir heat exchanger.

34. A greenhouse enclosure environment control system comprising a multi-source ground-to-air heat transfer system comprising of:
a) an enclosure comprising:
vii) roof;
viii) a floor;
ix) vegetation configured within the greenhouse;
b) a heat reservoir having a heat reservoir medium;
c) a heat pump heat exchange system comprising a first heat pump and a second heat pump, each comprising:
x) a condenser;
xi) a condenser heat exchanger;
xii) an expansion valve;
xiii) an evaporator heat exchanger that produces condensate water from a flow of air from the enclosure;
xiv) a compressor configured to pump a refrigerant through the heat pump exchange system; and
xv) a reversing valve;
xvi) a reheat coil;
wherein the first heat pump is configured to operate in a cooling and dehumidification mode while the second heat pump is configured to operate in a heating mode to both heat and dehumidify enclosure air within the greenhouse enclosure;
d) a misting system configured to dispense a mist of water into the enclosure;
e) a fluid-to-ground heat exchange system comprising:
xvii) a ground loop coupled with the heat pump exchange system and comprising:
a ground loop conduit extending through the heat reservoir; and
xviii) a ground loop pump;
xix) a thermal exchange fluid that is configured to be pumped by the ground loop pump to flow through the ground loop conduit and back to said heat pump heat exchange system;
wherein the thermal exchange fluid is diverted to a body of water and flows through an auxiliary heat exchanger to cool the thermal exchange fluid;
wherein, in a cooling and dehumidification mode, the evaporator heat exchanger produces a flow of cooled and dried air into the enclosure and the compressor heats the thermal exchange fluid flowing to the ground loop conduit, whereby the thermal reservoir medium is heated and the enclosure is cooled and dehumidified; and
wherein in a heating mode, the evaporator heat exchanger produces a flow of heated air into the enclosure and the condenser cools the thermal exchange fluid flowing to the ground loop conduit, whereby the heat reservoir is cooled and the enclosure is heated; and
wherein said condensate water from the heat pump heat exchange system is used for at least one of the misting system or for irrigation of the vegetation within the greenhouse enclosure.

35. The greenhouse enclosure environment control system of claim 34, further comprising a mixing chamber that receives airflow from the first heat pump and second heat pump and wherein the first heat pump heat and the second heat pump heat run in different modes; wherein the first heat pump heat runs in a cooling and dehumidification mode and while the second heat pump runs in a heating mode.

36. A greenhouse enclosure environment control system comprising a multi-source ground-to-air heat transfer system comprising of:
a) an enclosure comprising:
i) a roof;
ii) a floor;
iii) vegetation configured within the greenhouse;
wherein the enclosure has an exposed surface area with at least 25% windows to allow sunlight into the enclosure for the purpose of growing the vegetation
b) a heat reservoir having a heat reservoir medium configured at least partially under said floor of the enclosure;
c) a heat pump heat exchange system, each comprising a first heat pump and a second heat pump, each comprising:
i) a condenser;
ii) a condenser heat exchanger;
iii) an expansion valve;

iv) an evaporator heat exchanger that produces condensate water from a flow of air from the enclosure;
v) a compressor configured to pump a refrigerant through the heat pump exchange system; and
vi) a reheat coil;
d) a misting system configured to dispense a mist of water into the enclosure;
e) a fluid-to-ground heat exchange system comprising:
i) a ground loop coupled with the heat pump exchange system and comprising:
a ground loop conduit extending through the heat reservoir and under the floor of the enclosure;
ii) a ground loop pump;
iii) a thermal exchange fluid that is configured to be pumped by the ground loop pump to flow through the ground loop conduit and back to said heat pump heat exchange system;
wherein, in a cooling and dehumidification mode, the evaporator heat exchanger produces a flow of cooled and dried air into the enclosure and the compressor heats the thermal exchange fluid flowing to the ground loop conduit, whereby the thermal reservoir medium is heated and the enclosure is cooled and dehumidified; and
wherein in a heating mode, the evaporator heat exchanger produces a flow of heated air into the enclosure and the condenser cools the thermal exchange fluid flowing to the ground loop conduit, whereby the heat reservoir is cooled and the enclosure is heated;
wherein the first heat pump is configured to operate in a cooling and dehumidification mode while the second heat pump is configured to operate in a heating mode to both heat and dehumidify enclosure air within the greenhouse enclosure.

37. The greenhouse enclosure environment control system of claim 36, further comprising a mixing chamber that receives airflow from the first heat pump and second heat pump and wherein the first heat pump and the second heat pump run in different modes; wherein the first heat pump runs in a cooling and dehumidification mode and wherein the second heat pump runs in a heating mode.

38. The greenhouse enclosure environment control system of claim 36, wherein the heat reservoir is configured at least partially under the floor of the greenhouse enclosure.

39. The greenhouse enclosure environment control system of claim 38, wherein the ground loop is configured substantially under the enclosure, wherein at least 75% of the ground loop is configured under the enclosure.

40. The greenhouse enclosure environment control system of claim 38, wherein the ground loop comprises a ground-loop manifold comprising:
an inlet conduit;
an outlet conduit;
a plurality of extension conduits that each extend from the inlet conduit to the outlet conduit of the ground-loop manifold.

41. The greenhouse enclosure environment control system of claim 40, wherein the plurality of said extension conduits extends within 20 degrees of horizontal from the inlet conduit to the outlet conduit of the ground loop manifold.

42. The greenhouse enclosure environment control system of claim 40, wherein the ground loop manifold is a ground-loop mat, wherein the plurality of said extension conduits are coupled together.

43. The greenhouse enclosure environment control system of claim 42, wherein the ground loop comprises a plurality of mats.

44. The greenhouse enclosure environment control system of claim 42, wherein the ground loop comprises a first ground-loop mat and a second ground loop mat that each extend within 20 degrees of horizontal.

45. The greenhouse enclosure environment control system of claim 44, wherein the first and second ground-loop mats extends no more than 4 m under the enclosure.

46. The greenhouse enclosure environment control system of claim 36, wherein reheat coil heats a flow of air from the evaporator heat exchanger to produce said flow of heated air into the enclosure.

47. The greenhouse enclosure environment control system claim 36, wherein the heat pump heat exchange system produces condensate water that is used for irrigation of the vegetation within the greenhouse enclosure.

48. The greenhouse enclosure environment control system of claim 36, wherein the greenhouse enclosure environment control system is substantially self-contained wherein at least 50% of air within the enclosure is circulated from the enclosure through the heat pump exchange system and back into the enclosure.

49. The greenhouse enclosure environment control system claim 36, further comprising a hydration conduit that extends under the enclosure having a hydration outlet to dispense a hydration fluid to the thermal reservoir medium to increase the heat transfer of the thermal reservoir medium.

50. The greenhouse enclosure environment control system of claim 36, further comprising a cooling plenum system comprising:
a canopy configured a plenum offset distance from the roof of the enclosure; wherein airflow from heat pump heat exchange system is pumped through the canopy to exchange heat with the roof.

51. The greenhouse enclosure environment control system of claim 36, further comprising a water side economizer that comprises a heat exchanger configured to exchange heat with the enclosure air prior to the enclosure air returning to the heat pump.

52. The greenhouse enclosure environment control system of claim 51, wherein the water side economizer receives water into the heat exchanger from a body of water.

53. The greenhouse enclosure environment control system of-claim 36, wherein said fluid-to-ground heat exchange system is coupled with each of the first and second heat pumps.

54. The greenhouse enclosure environment control system of claim 36, wherein the thermal exchange fluid is diverted to a body of water and flows through an auxiliary heat exchanger to cool the thermal exchange fluid.

55. The greenhouse enclosure environment control system of claim 36, wherein the heat reservoir includes phase change material.

* * * * *